(12) United States Patent
Fukakusa

(10) Patent No.: US 11,035,986 B2
(45) Date of Patent: Jun. 15, 2021

(54) LIGHT SOURCE DEVICE AND PROJECTOR

(71) Applicant: PANASONIC INTELLECTUAL PROPERTY MANAGEMENT CO., LTD., Osaka (JP)

(72) Inventor: Masaharu Fukakusa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 49 days.

(21) Appl. No.: 16/576,192

(22) Filed: Sep. 19, 2019

(65) Prior Publication Data

US 2020/0012019 A1 Jan. 9, 2020

Related U.S. Application Data

(63) Continuation of application No. PCT/JP2018/011596, filed on Mar. 23, 2018.

(30) Foreign Application Priority Data

Mar. 28, 2017 (JP) .............................. JP2017-063271

(51) Int. Cl.
*G02B 3/08* (2006.01)
*F21S 41/24* (2018.01)
(Continued)

(52) U.S. Cl.
CPC ................ *G02B 3/08* (2013.01); *F21S 41/16* (2018.01); *F21S 41/24* (2018.01); *F21S 41/255* (2018.01);
(Continued)

(58) Field of Classification Search
CPC .......... F21S 41/24; F21S 41/16; F21S 41/255; G03B 21/2033; G03B 21/206
See application file for complete search history.

(56) References Cited

U.S. PATENT DOCUMENTS

2013/0182452 A1 7/2013 Takahira et al.

FOREIGN PATENT DOCUMENTS

JP 2013-149449 A 8/2013
JP 2014-002839 A 1/2014

OTHER PUBLICATIONS

International Search Report and Written Opinion dated Jun. 12, 2018 in International Application No. PCT/JP2018/011596; with partial English translation.

*Primary Examiner* — Anabel Ton
(74) *Attorney, Agent, or Firm* — McDermott Will and Emery LLP

(57) ABSTRACT

A light source device includes a semiconductor light-emitting element; an optical element including lens regions that change an intensity distribution of light emitted from the semiconductor light-emitting element; and a phosphor element that emits, as excitation light, the light with the intensity distribution changed by the optical element. Respective focal points of the lens regions are present in front of or behind a light-emitting surface of the phosphor element in different positions. At least one of the lens regions is astigmatic. An excitation beam from the at least one of the lens regions with the astigmatism forms a circle of least confusion near an associated one of the focal points, and a first focal line and a second focal line sandwiching the circle behind and in front of the circle, respectively. Beams from the lens regions overlap each other on the light-emitting surface of the phosphor element.

21 Claims, 28 Drawing Sheets

(51) Int. Cl.
*F21V 5/04* (2006.01)
*G03B 21/20* (2006.01)
*F21S 41/16* (2018.01)
*F21S 41/255* (2018.01)

(52) U.S. Cl.
CPC .............. *F21V 5/04* (2013.01); *G03B 21/206* (2013.01); *G03B 21/2033* (2013.01)

LIGHT SOURCE DEVICE AND PROJECTOR

CROSS REFERENCE TO RELATED APPLICATIONS

This application is a U.S. continuation application of PCT International Patent Application Number PCT/JP2018/011596 filed on Mar. 23, 2018, claiming the benefit of priority of Japanese Patent Application Number 2017-063271 filed on Mar. 28, 2017, the entire contents of which are hereby incorporated by reference.

BACKGROUND

1. Technical Field

The present disclosure relates to a light source device and a projector, and particularly to the following light source device and a projector using the light source device. The light source device utilizes the light radiated by irradiating a phosphor element with the light emitted from a semiconductor light-emitting element. The light source device is used interposed therebetween field of display devices such as projection display devices, or the field of lighting technology such as automotive and medical lighting.

2. Description of the Related Art

A light source device is known which utilizes the light radiated from a phosphor element by irradiating the phosphor element with the light emitted from a semiconductor light-emitting element such as a laser element. In such a light source device, the intensity distribution of the light (i.e., excitation light) used to irradiate the phosphor element to reduce a decrease in the conversion efficiency of the phosphor element under influence of the heat generated by the excitation light needs to be improved. Attempts are thus made to uniformize the intensity distribution of the light used to irradiate the phosphor element (see, e.g., Japanese Unexamined Patent Application Publication Nos. 2013-149449 and 2014-2839). FIG. 27 illustrates a configuration of a known light source device 1100 disclosed in Japanese Unexamined Patent Application Publication No. 2013-149449.

In light source device 1100 shown in FIG. 27, the light emitted from laser element (i.e., laser chip) 1111 of laser source 1110 is incident through the incident surface of optical rod 1120 and propagated inside optical rod 1120 while being reflected multiple times. This uniformizes the intensity distribution of the light emitted from laser element 1110 so that the light has a uniform intensity distribution when reaching emission surface 1121 of optical rod 1120. Being emitted as divergent light, the light emitted from optical rod 1120 is collected by lens 1130 to irradiate light emitter 1140. In this manner, light source device 1100 uniformizes the intensity distribution of the light projected onto light emitter 1140, using optical rod 1120.

FIG. 28 illustrates a configuration of a known light source device 1200 disclosed in Japanese Unexamined Patent Application Publication No. 2014-2839.

In light source device 1200 shown in FIG. 28, the light radiated from laser sources 1210 is converted into parallel light by collimator lenses 1220, and incident on hologram element 1230. Hologram element 1230 is configured to uniformize the intensity distribution of excitation light on phosphor 1240. In this manner, light source device 1200 uniformizes the intensity distribution of the excitation light projected by hologram element 1230 onto phosphor 1240.

SUMMARY

The light source device disclosed in Japanese Unexamined Patent Application Publication No. 2013-149449 employs the optical rod to obtain a uniform light intensity distribution. However, since a larger number of reflections are performed in the multiple reflection to obtain the uniform light intensity distribution, the optical rod needs to have a certain length. In addition, the light emitted from the optical rod becomes divergent light, which needs to be thus collected once by the lens to irradiate the phosphor. This increases the distance from the light-emitting element to the phosphor. In this manner, the attempt to obtain a uniform light intensity distribution using an optical rod hinders miniaturization of a light source device.

The light source device disclosed in Japanese Unexamined Patent Application Publication No. 2014-2839 employs the hologram element to obtain a uniform light intensity distribution. However, hologram elements utilize diffraction phenomenon of light and are thus believed to be less efficient than lenses. The efficiencies may largely decrease due to individual differences in the wavelengths of the light emitted from laser elements, changes in the wavelength of emitted light with a temperature, or the state of the wavefront of the light (e.g., divergent light or collected light) incident on the hologram element. Such a decrease in the efficiencies hinders efficient guide of the excitation light from the laser element to the phosphor. There are single mode laser elements and multi-mode laser elements. A multi-mode laser element is generally used as a light source for lighting, which requires an optical output of 1 W or higher. However, in a multi-mode laser element, some emitted wavefronts overlap each other in the multi-mode direction. Sufficient efficiency is thus not expected with the use of a hologram element designed assuming that incident light has a constant wavefront. In this manner, the attempt to obtain a uniform light intensity distribution using a hologram element hinders efficient conversion of light from a laser element into light with a uniform intensity distribution.

The present disclosure was made to solve the problems described above. It is an objective of the present disclosure to provide the following small-size light source device and a projector including the light source device. The light source device efficiently converts the light emitted from a semiconductor light-emitting element (i.e., a laser element) into light with a uniform intensity distribution. The light source device also facilitates designing of the intensity distribution of excitation light.

In order to achieve the objective, a light source device according one aspect of the present disclosure includes: a laser element; an optical element including a plurality of lens regions that are divisional regions and change an intensity distribution of light emitted from the laser element; and a phosphor element that emits, as excitation light, the light with the intensity distribution changed by the optical element. Focal points of the plurality of lens regions are present in front of or behind a light-emitting surface of the phosphor element in different positions. At least one of the plurality of lens regions is astigmatic. An excitation beam from the at least one of the plurality of lens regions that is astigmatic forms a circle of least confusion near an associated one of the focal points, and a first focal line and a second focal line sandwiching the circle of least confusion behind and in front of the circle of least confusion. Beams from the plurality of lens regions overlap each other on the light-emitting surface of the phosphor element.

With this configuration, the light emitted from the laser element and incident on the optical element is converted by the plurality of lens regions into a plurality of excitation beams, which are then focused on focal points so as to be propagated to the phosphor element. The respective focal points of the plurality of lens regions are present in front of or behind the phosphor element, and overlap each other on the light-emitting surface of the phosphor element. The beams emitted from the laser element and incident on the plurality of lens regions have overlapping intensity distributions. That is, the beams are converted into beams with uniformed intensity distributions. The beam incident on the one of the lens regions with the astigmatism is converted into an excitation beam composed of rays in two orthogonal directions with the astigmatism, which are most focused in different positions. This allows for individual setting of the beam widths in the two directions on the light-emitting surface of the phosphor element. Accordingly, a small-size light source device is achieved, which efficiently converts the light emitted from a laser element into excitation light with a uniform intensity distribution and desired beam widths.

In the light source device according another aspect of the present disclosure, the plurality of lens regions may be divided into regions along a first axis and regions along a second axis orthogonal to the first axis. The light emitted from the laser element may be incident on the plurality of lens regions at a smaller angle of radiation along the second axis than along the first axis. Light along the first axis may be most focused in a position corresponding to the first focal line, and light along the second axis may be most focused in a position corresponding to the second focal line.

This configuration focuses the beam, which is radiated from the laser element at a smaller angle, closer to the light-emitting surface of the phosphor element, and the beam, which is radiated at a greater angle, farther from the light-emitting surface of the phosphor element. The configuration allows for more free setting of the widths of the excitation beams on the light-emitting surface of the phosphor element. Accordingly, the design range increases in which the beam widths are equal in the two directions.

In the light source device according another aspect of the present disclosure, the plurality of lens regions may be astigmatic. In an intensity distribution of the excitation light from the plurality of lens regions on the light-emitting surface of the phosphor element, $D1 \leq D2$ may be satisfied, where D1 denotes a beam width along the first axis and D2 denotes a beam width along the second axis.

This configuration increases the design ranges of an elongates beam profile with a uniformized intensity distribution.

In the light source device according another aspect of the present disclosure, a divisional width along the first axis may be greater than a divisional width along the second axis.

This configuration efficiently converts the light emitted from the laser element into excitation beams, provides a sufficient number of excitation beams overlapping on the light-emitting surface of the phosphor element. This provides a uniformized light intensity distribution, and facilitates the designing of the widths of the excitation beams in the intensity distributions on the light-emitting surface of the phosphor element.

In the light source device according another aspect of the present disclosure, the phosphor element may be inclined about the first axis. Each of the plurality of lens regions may be astigmatic. Second focal lines of the plurality of lens regions may be present near the light-emitting surface of the phosphor element.

This configuration reduces extension of the beam widths along the slope of the phosphor element, even if the phosphor element is inclined about the optical axis of the optical element. Accordingly, the design range increases in which the beam widths are equal in the two directions.

In the light source device according another aspect of the present disclosure, the optical element may be rectangular in a plan view.

This configuration increases the number of optical elements obtained from a wafer in fabrication of the optical elements. This improves the mass productivity of the optical elements and the light source devices including the optical elements.

In the light source device according another aspect of the present disclosure, the plurality of lens regions may form a Fresnel lens. A step may be located around and in contact with the plurality of lens regions.

This configuration allows, for example, a developer to smoothly flow through the step, when the optical element is fabricated by photolithography and etching. This allows for uniform development throughout the entire resist region, which will be divided into the plurality of lens regions, and thus for accurate formation of a resist pattern. Since the plurality of lens regions are fabricated at a high accuracy, a light source device is achieved, which includes an optical element fabricated at a high accuracy.

In the light source device according another aspect of the present disclosure, the optical element may include a glass substrate, and a dielectric film on the glass substrate. The plurality of lens regions may be located in the dielectric film.

This configuration allows for fabrication of an optical element having a flat surface with a low surface roughness at low costs. Accordingly, a high-quality light source device is achieved at low costs.

In the light source device according another aspect of the present disclosure, an absorption film that absorbs peripheral light around the light emitted from the laser element may be formed around the plurality of lens regions.

This configuration blocks the peripheral light, which hardly contributes to the efficiency, inside the optical element. This provides a sufficient efficiency in converting the light into the excitation beams, and reduces the size of the optical element. Accordingly, a high-efficiency, small-size light source device is achieved.

In the light source device according another aspect of the present disclosure, the optical element may include a convex lens that changes an angle of divergence of the light emitted from the laser element. Light transmitted through the convex lens may be incident on the plurality of lens regions.

This configuration efficiently focuses the light emitted from the laser beam on the phosphor element, and converts the light into the excitation beams. Accordingly, a high-efficiency light source device is achieved.

In this case, the convex lens may be a Fresnel lens. A step may be located around and in contact with the convex lens.

This configuration reduces the thickness of the optical element. Accordingly, a small-size light source device is achieved.

In this case, an opening film that blocks peripheral light around the light emitted from the laser element may be formed around the plurality of lens regions.

This configuration blocks the peripheral light, which hardly contributes to the efficiency, inside the optical element. This provides a sufficient efficiency in converting the light into the excitation beams, and reduces the size of the optical element. Accordingly, a high-efficiency, small-size light source device is achieved.

In the light source device according another aspect of the present disclosure, some or all of the plurality of lens regions are in quadrangular or hexagonal shapes.

This configuration significantly reduces the size of the region, which fails to serve as the lens regions, and thus allows for more efficient conversion of the light into the excitation beams.

In the light source device according an aspect of the present disclosure, in an intensity distribution of the excitation light on the light-emitting surface of the phosphor element, D that denotes a beam width as a design value, D1 that denotes a beam width along the first axis, and D2 that denotes a beam width along the second axis may satisfy relational expressions $D=W\times(F2/F1)/\cos(\theta)$, $D<D1<W1$, and $D<D2<W1$, where W1 denotes a divisional width of each of the plurality of lens regions along the first axis, W denotes a stripe width of the laser element in a direction with a smaller angle of radiation, F1 denotes a focal length on a side that receives radiation light from the laser element, F2 denotes a distance from the plurality of lens regions formed in the optical element to the light-emitting surface of the phosphor element along an optical axis of the excitation light, and $\theta$ is an incident angle of the excitation light incident on the light-emitting surface of the phosphor element.

This configuration facilitates the designing, in which the beam widths are equal in two orthogonal directions, even if the laser element is a multi-mode laser and the phosphor element is inclined about the optical axis of the optical element.

In the light source device according another aspect of the present disclosure, the intensity distribution on the light-emitting surface of the phosphor element may be in a shape of a truncated quadrangular pyramid with two base sides at least partially parallel to the first axis, and two base sides at least partially parallel to the second axis.

This configuration facilitates the designing of a uniformized intensity distribution of excitation light on the light-emitting surface of the phosphor element.

A light source device according one aspect of the present disclosure includes: a laser element including a plurality of emitters; an optical element including a plurality of lens regions that change an intensity distribution of light emitted from the laser element; and a phosphor element that emits, as excitation light, the light with the intensity distribution changed by the optical element. Respective focal points of the plurality of lens regions are present in front of or behind a light-emitting surface of the phosphor element in different positions. Each of the plurality of lens regions is astigmatic. Each of excitation beams forms a circle of least confusion near an associated one of the focal points, and a first focal line and a second focal line sandwiching the circle of least confusion, with the second focal line located at one side of the circle of least confusion, which is closer to the phosphor element, and the first focal line located at an other side. Beams from the plurality of lens regions associated with the plurality of emitters overlap each other on the light-emitting surface of the phosphor element, and beams from adjacent ones of the plurality of emitters partially overlap each other at least on the light-emitting surface of the phosphor element.

This configuration provides a higher output using the laser element including the plurality of emitters, and thus efficiently converts the light emitted from the laser element into single uniform excitation light. Accordingly, a small-size light source device is achieved.

In the light source device according an aspect of the present disclosure, the plurality of lens regions may be divided into those along a first axis and those along a second axis orthogonal to the first axis. The light emitted from the laser element may be incident on the plurality of lens regions at a smaller angle of radiation along the second axis than along the first axis. Light along the first axis may be most focused in a position corresponding to the first focal line, and light along the second axis is most focused in a position corresponding to the second focal line.

This configuration focuses the light radiated at a smaller angle, closer to the light-emitting surface of the phosphor element, and the light radiated at a greater angle, farther from the light-emitting surface of the phosphor element; even if the laser element including the plurality of emitters is used. This allows for more free setting of the widths of the excitation beams on the light-emitting surface of the phosphor element. Accordingly, the design range increases in which the beam widths are equal in the two directions.

In light source device according to another aspect of the present disclosure, the phosphor element may be inclined about the first axis. The second focal line of each of the plurality of lens regions is present near the light-emitting surface of the phosphor element.

This configuration reduces extension of the beam widths along the slope of the phosphor element, even if the laser element including the plurality of emitters is used and the phosphor element is inclined about the optical axis of the optical element. Accordingly, the design range increases in which the beam widths are equal in the two directions.

A projector according to an aspect of the present disclosure includes the light source device according to any one of the aspects described above.

This configuration provides a small-size projector.

The present disclosure provides a small-size light source device that efficiently converts the light emitted from a laser element into uniform excitation light and facilitates designing of the intensity distribution of the excitation light.

BRIEF DESCRIPTION OF DRAWINGS

These and other objects, advantages and features of the disclosure will become apparent from the following description thereof taken in conjunction with the accompanying drawings that illustrate specific embodiments of the present disclosure.

DETAILED DESCRIPTION OF THE EMBODIMENTS

Embodiments of the present disclosure will be described with reference to the drawings. Note that the embodiments described below are mere specific advantageous examples of the present disclosure. The numerical values, constituent elements, the arrangement and connection of the constituent elements, the steps, the step orders etc. shown in the following embodiments are thus mere examples, and are not intended to limit the scope of the present disclosure. Among the constituent elements in the following embodiments, those not recited in any of the independent claims defining the broadest concept of the present disclosure are described as optional constituent elements.

In the specification and drawings, coordinate axis 95 as a first axis, coordinate axis 96 as a second axis, and coordinate axis 97 as a third axis represent the three axes of a three-dimensional orthogonal coordinate system. Similarly, coordinate axis 95' as a first axis, coordinate axis 96' as a second axis, and coordinate axis 97' as a third axis also represent the three axes of the three-dimensional orthogonal coordinate system.

Embodiment 1

Now, a light source device according to Embodiment 1 of the present disclosure will be described with reference to the drawings.

Configuration

Figure 1:
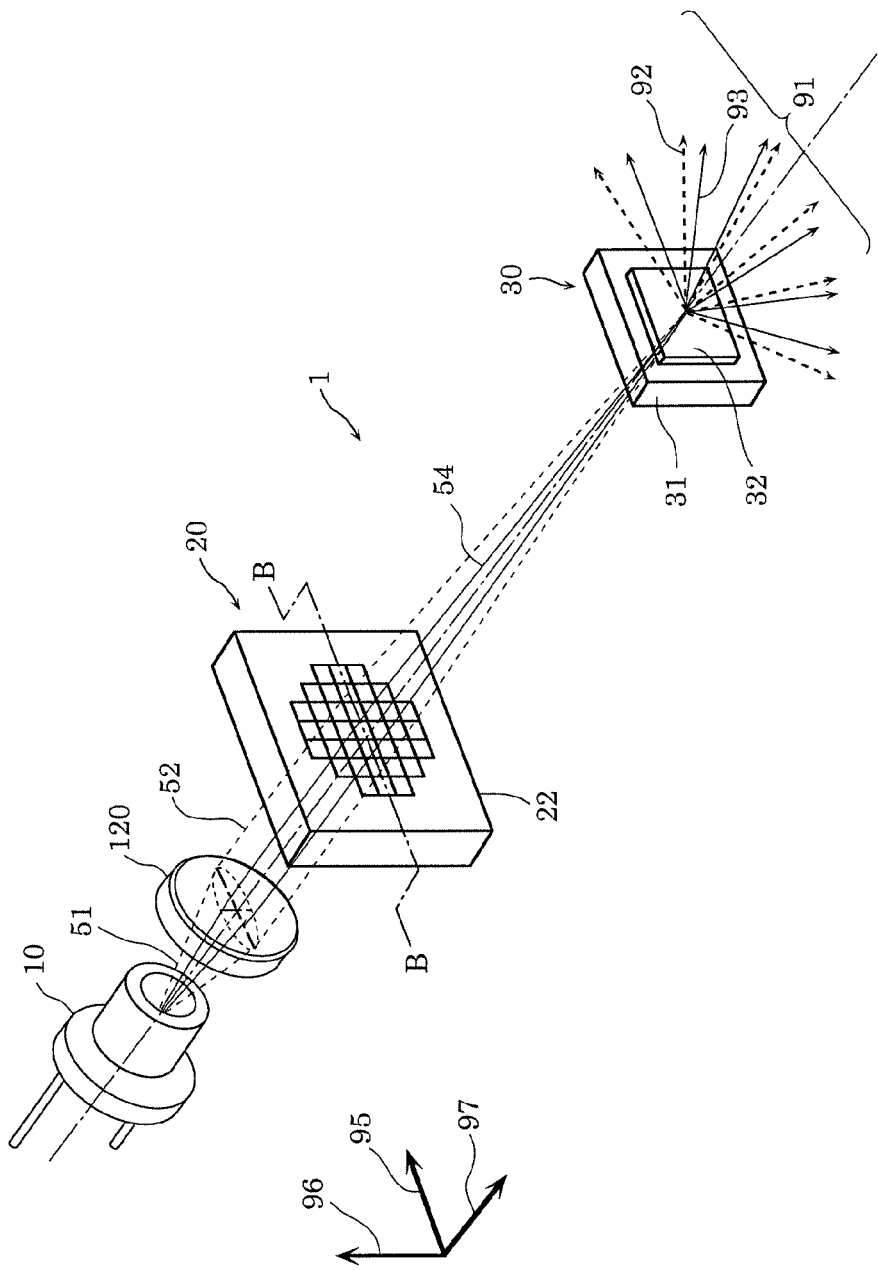
FIG. 1 illustrates a configuration of a light source device according to Embodiment 1 of the present disclosure.

FIG. 1 illustrates a configuration of light source device 1 according to Embodiment 1 of the present disclosure.

As shown in FIG. 1, light source device 1 includes semiconductor light-emitting device 10 and optical element 20. Light source device 1 forms the distribution of the light emitted from semiconductor light-emitting device 10 at optical element 20 and projects the formed light onto phosphor element 30, which is an irradiation target. In this embodiment, light source device 1 further includes phosphor element 30. Phosphor element 30 is fixed in a predetermined position inside light source device 1. The constituent members of light source device 1 will be described below in detail.

Figure 2:
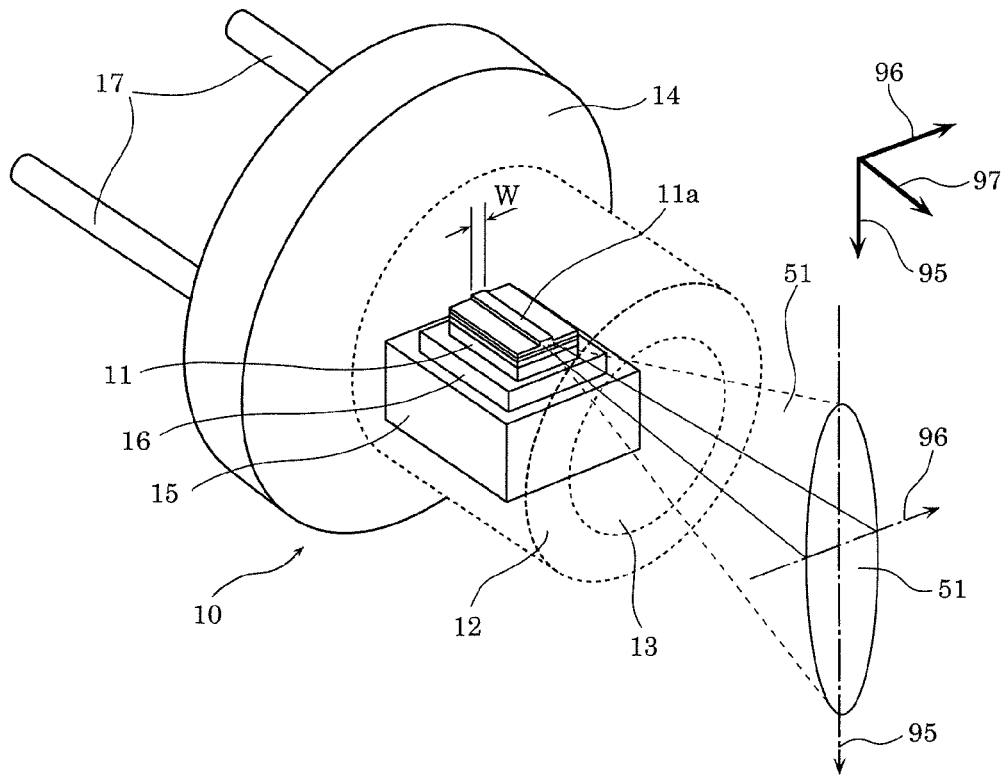
FIG. 2 illustrates a configuration of a semiconductor light-emitting device in the light source device according to Embodiment 1 of the present disclosure.

First, a configuration of semiconductor light-emitting device 10 used for light source device 1 will be described with reference to FIG. 2. FIG. 2 illustrates the configuration of semiconductor light-emitting device 10 used for light source device 1.

As shown in FIG. 2, semiconductor light-emitting device 10 is a packaged light-emitting device, which includes semiconductor light-emitting element 11 having optical waveguide 11a with stripe width (i.e., ridge width) W and metal cap (can) 12 forming the package.

Semiconductor light-emitting element 11 is disposed inside cap 12. Specifically, semiconductor light-emitting element 11 is mounted above post 15, which is disposed on disk-like base 14, via sub-mount 16. In this embodiment, semiconductor light-emitting element 11 is disposed so that stripe width W of optical waveguide 11a extends along coordinate axis 96. That is, semiconductor light-emitting element 11 is disposed so that the length (i.e., the stripe) of optical waveguide 11a extends along coordinate axis 97.

Window glass 13 is attached to cap 12 to transmit light 51 emitted from semiconductor light-emitting element 11. Window glass 13 is an example of a translucent member, which transmits light 51 emitted from semiconductor light-emitting element 11, and is a plate glass in this embodiment. Note that semiconductor light-emitting device 10 is further provided with lead pin 17, through which electric power is supplied from outside to semiconductor light-emitting element 11.

Semiconductor light-emitting element 11 is a laser element (e.g., a GaN-based laser element) made of, for example, nitride semiconductor, and radiates, as emitted light 51, a laser beam having a peak wavelength within the wavelengths of 380 nm to 490 nm.

The angles of radiation of light 51 emitted from semiconductor light-emitting element 11 are different in two orthogonal directions. Specifically, with respect to emitted light 51, the angle of radiation in the direction of coordinate axis 95 is smaller than that of coordinate axis 96. That is, the direction of stripe width W agrees with the direction with the smaller angle of radiation.

Lens 120 is disposed in front of semiconductor light-emitting device 10 near window glass 13. Lens 120 functions to convert emitted light 51, radiated from semiconductor light-emitting device 10 (i.e., semiconductor light-emitting element 11) into substantially parallel light. Lens 120 is, for example, a collimator lens.

Optical element 20 is disposed between semiconductor light-emitting device 10 and phosphor element 30. Specifically, optical element 20 is disposed between lens 120 and phosphor element 30. Substantially parallel light is thus incident on optical element 20 from lens 120.

Optical element 20 includes a plurality of lens regions 21 that function to change the intensity distribution of light 51 emitted from semiconductor light-emitting element 11. The detail of the plurality of lens regions 21 will be described later.

Light 51 emitted from semiconductor light-emitting element 11 is transmitted through optical element 20 so that the intensity distribution of the light changes. The light is converted to collected light to be, as excitation light 54, incident on phosphor element 30.

Phosphor element 30 is excited by excitation light 54 to emit fluorescence. Phosphor element 30 includes a phosphor as a wavelength conversion material that convers the wavelength of incident light. For example, phosphor element 30 includes support member 31, and phosphor layer 32 formed on the surface of support member 31 and containing the phosphor.

Support member 31 may be, for example, a transparent substrate with a high thermal conductivity. Support member 31 may be made of, for example, $Al_2O_3$. As an example, support member 31 is a transparent sapphire substrate.

It is advantages if a dichroic mirror that transmits excitation light 54 and reflects the light generated by phosphor layer 32 is formed on the surface of support member 31, which is provided with phosphor layer 32. The dichroic mirror may be a multilayer film of a plurality of dielectric layers with different refractive indexes. The formation of the dichroic mirror allows for efficient guide of excitation light 54 to phosphor layer 32, and reduces transmission of the light generated by phosphor layer 32 toward the incident side. If the dichroic mirror is formed, phosphor layer 32 is formed on the dichroic mirror.

Phosphor layer 32, is, for example, configured as a layer obtained by diffusing the phosphor (phosphor particles) inside a transparent organic or inorganic binder made of, for example, silicone or glass. The phosphor emits fluorescence using incident light as excitation light. The phosphor may be made of, for example, a cerium-activated yttrium aluminum garnet ($YAG:Ce^{3+}$)-based phosphor material. The material is however not limited thereto.

A part of the light (i.e., excitation light 54) incident on phosphor element 30 is absorbed at phosphor element 30 so that the wavelength is converted at the phosphor, to become fluorescence 93 diffused radially. The other part is reflected and diffused on the surface or inside phosphor element 30 to become scattered light 92 diffused (i.e., scattered) radially. Synthetic light of fluorescence 93 and scattered light 92 is radiated as radiation light 91 from phosphor element 30. In this case, the phosphor may be made of a phosphor material (e.g., a yellow phosphor material), which absorbs light (e.g., blue light) with a wavelength of 420 nm to 480 nm and radiates fluorescence with a wavelength of 500 nm to 630 nm. This material radiates white light, which has been obtained by synthesizing fluorescence 93 and scattered light 92, as radiation light 91 from phosphor element 3. In this Embodiment 1, phosphor element 30 is disposed almost parallel to optical element 20. Light 91 is radiated forward from phosphor element 30 in the direction in which excitation light 54 is incident.

Next, a configuration and a function of optical functional part 22 of optical element 20 according to Embodiment 1 of the present disclosure will be described in detail with reference to FIG. 1 together with FIGS. 3, 4, 5A and 5B. In FIG. 1, optical functional part 22 is formed on the surface emitting excitation light 54, that is, the surface facing phosphor element 30, of optical element 20.

Figure 3:
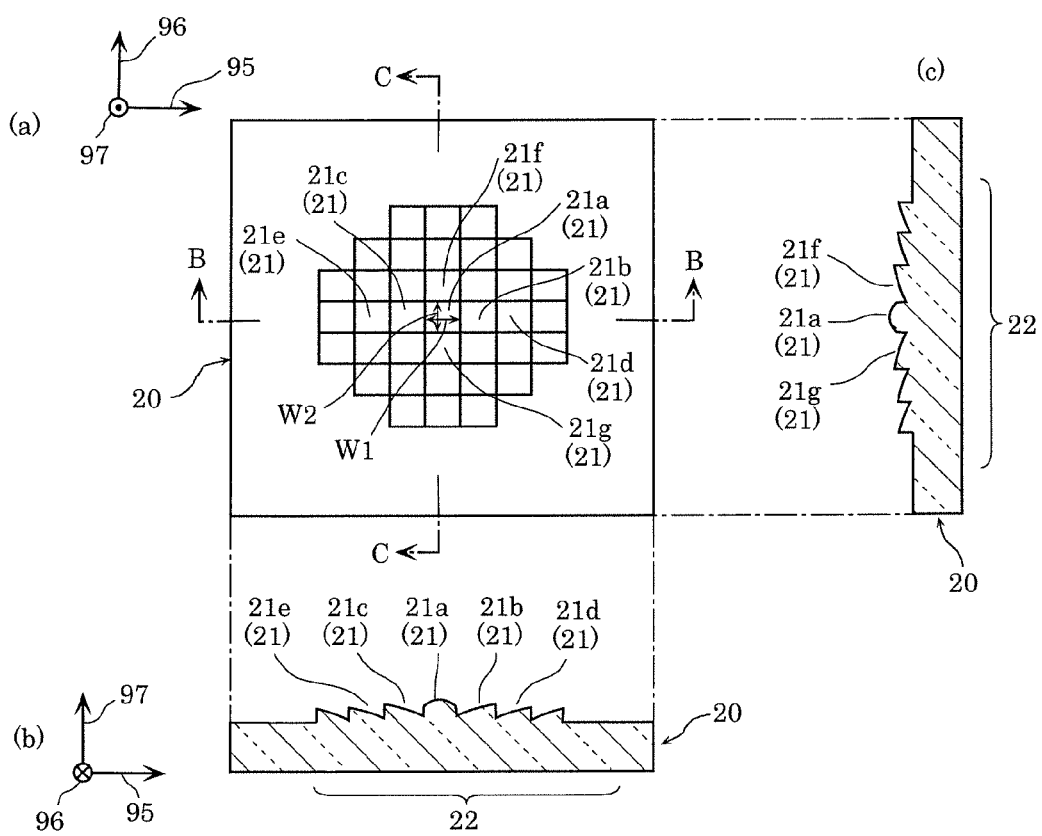
FIG. 3 illustrates a configuration of an optical element in the light source device according to Embodiment 1 of the present disclosure.

First, a configuration of optical element 20 will be described with reference to FIG. 3. FIG. 3 illustrates the configuration of optical element 20 in light source device 1 according to Embodiment 1 of the present disclosure. Section (a) of FIG. 3 is a plan view of optical element 20 as viewed the side emitting excitation light 54 in FIG. 1. Section (b) of FIG. 3 is a cross-sectional view taken along line B-B of (a). Section (c) of FIG. 3 is a cross-sectional view taken along line C-C of (a). The cross-section taken along line B-B of (a) of FIG. 3 is identical with that of FIG. 1.

As shown in (a) to (c) of FIG. 3, optical element 20 is, as optical functional part 22, divided into a plurality of lens regions 21 (21a, 21b, 21c, 21d, 21e, 21f, 21g, . . . ). The plurality of lens regions 21 are divisional regions (unit regions) of optical functional part 22. In this embodiment, the plurality of lens regions 21 are divided into those along coordinate axis 95 (i.e., the first axis) and those along coordinate axis 96 (i.e, the second axis). Optical element 20 changes the intensity distribution of light 51 emitted from semiconductor light-emitting element 11 using the plurality of lens regions 21 (i.e., optical functional part 22).

The plurality of lens regions 21 are lenses, each of which functions to collect light. That is, each lens region 21 functions to individually converge the light incident on optical element 20.

In this embodiment, each lens region 21 has a quadrangular shape in a plan view with widths W1 and W2. W1 is a width along coordinate axis 95 (i.e., in a first direction), whereas W2 is a width along coordinate axis 96 (i.e., in a second direction). In this embodiment, width W1 is equal to width W2, but may be inequal. That is, width W1 and width W2 may satisfy W1>W2 or W1<W2.

In this embodiment, optical element 20 includes the plurality of lens regions 21, which are all quadrangles. The configuration is not limited thereto. Each of the plurality of lens regions 21 may be in any shape other than the quadrangle.

Figure 4:
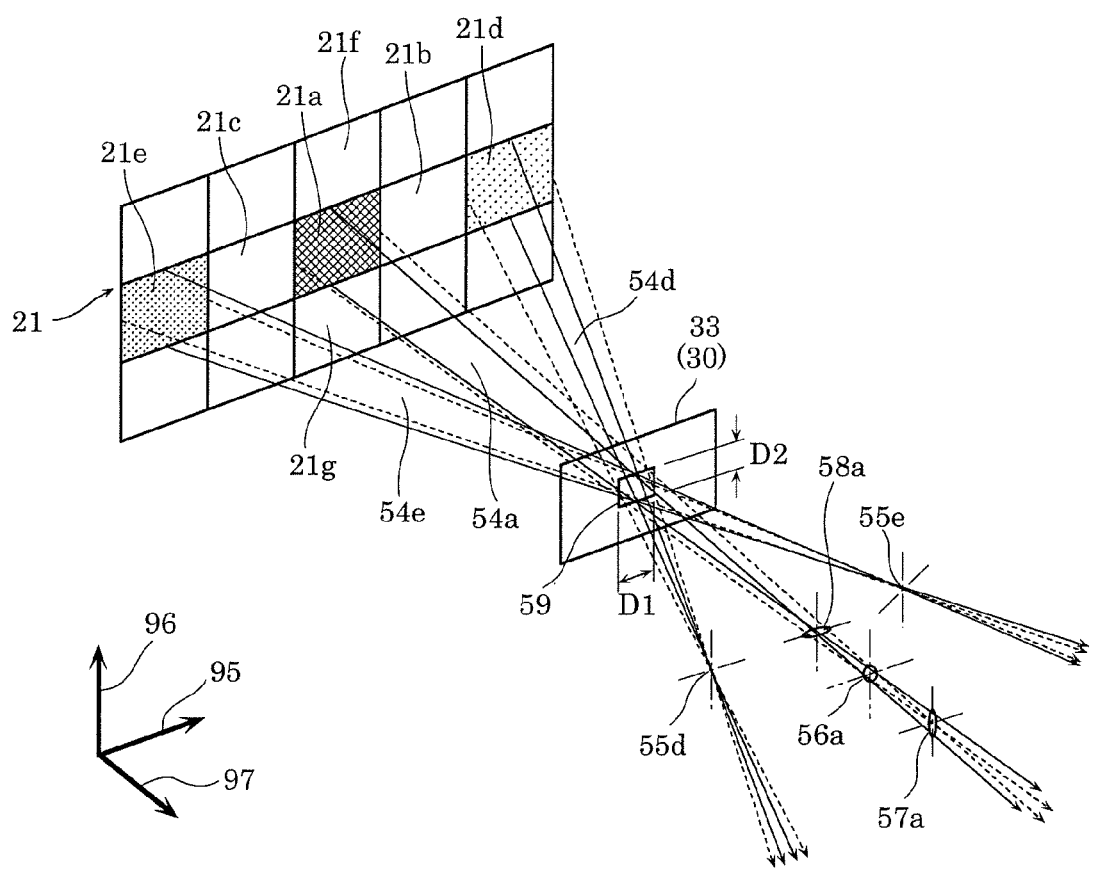
FIG. 4 illustrates a function of the optical element in the light source device according to Embodiment 1 of the present disclosure.

Next, a function of the plurality of lens regions 21 (i.e., optical functional part 22) of optical element 20 will be described with reference to FIG. 4. FIG. 4 illustrates a function of optical element 20 in light source device 1 according to Embodiment 1 of the present disclosure. FIG. 4 illustrates how to collect excitation light 54 (i.e., respective excitation beams) emitted from the plurality of lens regions 21.

FIG. 4 shows individual lens regions 21 (the lens shapes are not shown), and illustrates how to collect excitation beams 54a, 54d, and 54e from lens regions 21a, 21d, and 21e of the plurality of lens regions 21. In FIG. 4, light-emitting surface 33 represents the light-emitting surface of phosphor element 30 in FIG. 1. The surface is defined to be identical with the surface, on which excitation light 54 is incident, that is, with the boundary plane between support member 31 and phosphor layer 32.

As shown in FIG. 4, the light incident on lens region 21d is converted into excitation beam 54d, which is focused to form focal point 55d behind light-emitting surface 33. The light incident on lens region 21e is converted into excitation beam 54e, which is focused at focal point 55e behind light-emitting surface 33. Focal point 55d of excitation beam 54d and focal point 55e of excitation beam 54e are located in different positions.

In this embodiment, lens region 21a is astigmatic in addition to the function of focusing light behind light-emitting surface 33. Lens region 21a is astigmatic along coordinate axis 95 as the first axis, and coordinate axis 96 as the second axis. Light 52 incident on lens region 21a (see FIG. 1) is converted into excitation beam 54a, which forms circle 56a of least confusion, first focal line 57a, and second focal line 58a due to the astigmatism of lens region 21a. Circle 56a of least confusion is formed behind light-emitting surface 33. First focal line 57a and second focal line 58a sandwich circle 56a of least confusion behind and in front of the circle, respectively. At this time, circle 56a of least confusion of excitation beam 54a is located in a different position from focal point 55d of excitation beam 54d and focal point 55e of excitation beam 54e. First focal line 57a and second focal line 58a sandwich circle 56a of least confusion at the side of circle 56a farther from light-emitting surface 33 and the side closer to light-emitting surface 33, respectively.

The positions of circle 56a of least confusion, focal point 55d, and focal point 55e are set so that excitation beam 54a, excitation beam 54d and excitation beam 54e overlap each other at light-emitting surface 33.

Although not shown in the figures, the light incident on the other lens regions 21 (21c, 21b, 21g, 21f, . . . ) is converted into excitation beams, which are focused to different focal points behind light-emitting surface 33. Respective excitation beams overlap each other on light-emitting surface 33.

In this manner, the light incident on the plurality of lens regions 21 is collected by the plurality of lens regions 21 to become the excitation beams, which overlap each other on light-emitting surface 33. Accordingly, excitation light spot 59 is formed on light-emitting surface 33.

At this time, with respect to excitation beam 54a emitted from lens region 21a with the focal point and astigmatism, rays along coordinate axis 95 (i.e., the first axis) are most focused on first focal line 57a, and rays along coordinate axis 96 (i.e., the second axis) are most focused on second focal line 58a. The application of the astigmatism allows for conversion of the light incident on lens region 21a into excitation beam 54a with the rays along the two orthogonal axes, which are most focused in different positions. The focal point and astigmatism of lens region 21a are set so that excitation beam 54a forming excitation light spot 59 on light-emitting surface 33 has the following beam widths in excitation light spot 59. The beam has width D1 along coordinate axis 95 (i.e., the first axis), and width D2 along coordinate axis 96 (i.e., the second axis).

The light incident on lens regions 21 (21b, 21c, 21d, 21e, 21f, 21g, . . . ) other than lens region 21a is converted into excitation beams (54d, 54e, . . . ), which are focused to the respective focal points (55d, 55e, . . . ) and have the following widths on light-emitting surface 33. The beams have widths smaller than D1 along coordinate axis 95 (i.e., the first axis), and widths smaller than D2 along coordinate axis 96 (i.e., the second axis). These excitation beams overlap each other inside excitation light spot 59 of light-emitting surface 33.

Figure 5A:
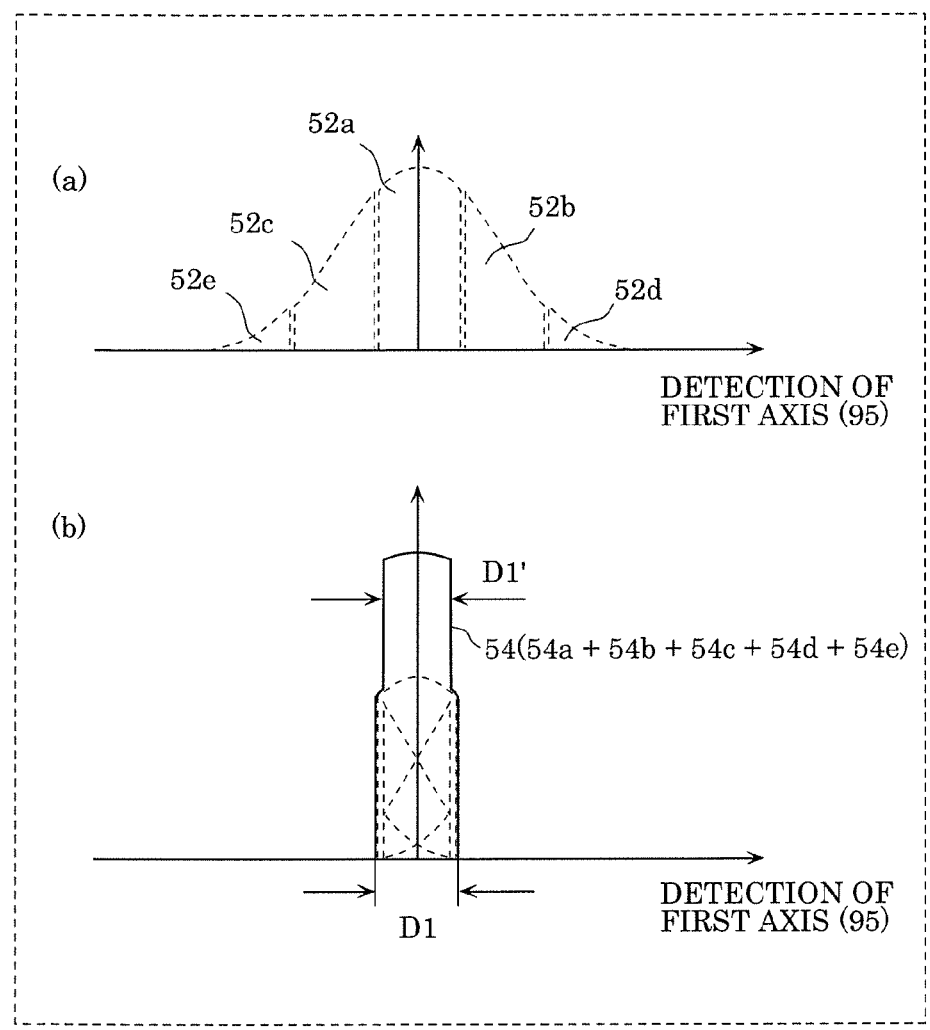
FIG. 5A illustrates a change in the intensity distribution of light passing through the optical element along a first axis in the light source device according to Embodiment 1 of the present disclosure.
Figure 5B:
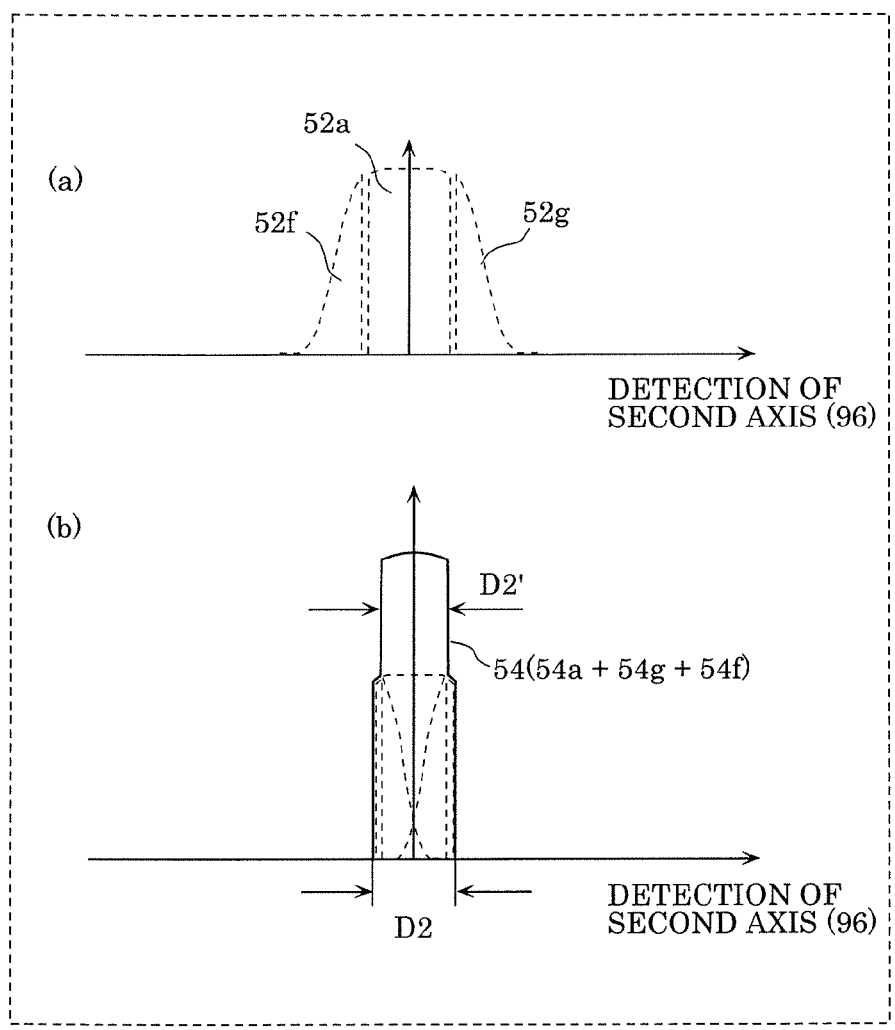
FIG. 5B illustrates a change in the intensity distribution of the light passing through the optical element along a second axis in the light source device according to Embodiment 1 of the present disclosure.

Next, how the intensity distribution of incident light 52 passing through lens regions 21 (i.e., optical functional part 22) of optical element 20 changes will be described with reference to FIGS. 5A and 5B. FIGS. 5A and 5B illustrate a change in the intensity distribution of the light passing through optical element 20 in light source device 1 according to Embodiment 1 of the present disclosure. FIG. 5A illustrates a change in the intensity distribution along the first axis. FIG. 5B illustrates a change in the intensity distribution along the second axis.

Section (a) of FIG. 5A illustrates intensity distributions (52a, 52b, 52c, 52d, and 52e) of light 52, which is incident on the plurality of lens regions 21, along coordinate axis 95 (i.e., the first axis). That is, (a) of FIG. 5A illustrates the intensity distribution of the light corresponding to the light incident on the cross-section taken along B-B of optical element 20 shown in (b) of FIG. 3. As shown in (a) of FIG. 5A, incident light 52 is divided into the plurality of lens regions 21 (21a, 21b, 21c, 21d, and 21e).

Section (b) of FIG. 5A illustrates the intensity distribution of light (i.e., excitation beams) along coordinate axis 95 (i.e., the first axis) in excitation light spot 59 formed on light-emitting surface 33. The light, which has passed through optical element 20 (i.e., optical functional part 22) and has the intensity distributions shown in (a) of FIG. 5A, is converted into the excitation beams by lens regions 21 (21a, 21b, 21c, 21d, and 21e).

Along coordinate axis 95 (i.e., the first axis), incident light 52a of the light intensity distributions shown in (b) of FIG. 5A is converted into the excitation beam by lens region 21a with the focal point and astigmatism. The light (i.e., the excitation beam) forms an intensity distribution with width D1 on light-emitting surface 33.

The incident light (52b, 52c, 52d, and 52e) other than incident light 52a of the light intensity distributions shown in (b) of FIG. 5A is converted into the excitation beams by the lens regions (21b, 21c, 21d, and 21e). The excitation beams are focused at respective focal points, which are set so that the excitation beams have widths (D1') smaller than D1 on light-emitting surface 33. That is, the intensity distributions of light (i.e., the excitation beams) with widths D1' are formed on light-emitting surface 33. In other words, the other incident light beams (52b, 52c, 52d, and 52e) overlap each other within beam width D1.

Section (a) of FIG. 5B illustrates intensity distributions (52a, 52f, and 52g) of light 52, which is incident on the plurality of lens regions 21, along coordinate axis 96 (i.e., the second axis). That is, (a) of FIG. 5B illustrates the intensity distribution of the light corresponding to the light incident on the cross-section taken along C-C of optical element 20 shown in FIG. 3. As shown in (a) of FIG. 5B, incident light 52 is divided into the plurality of lens regions 21 (21a, 21f, and 21g). The light intensity distribution of (a) of FIG. 5B is different from that of (a) of FIG. 5A due to the angle characteristics of light radiated from semiconductor light-emitting element 11 as described above.

Section (b) of FIG. 5B illustrates the intensity distributions of light (i.e., excitation light) along coordinate axis 96 (i.e., the second axis) in excitation light spot 59 formed on light-emitting surface 33. The light, which has passed through optical element 20 (i.e., optical functional part 22) and has the intensity distributions shown in (a) of FIG. 5B, is converted into the excitation beams by lens regions 21 (21a, 21f, and 21g).

Along coordinate axis 96 (i.e., the second axis), incident light 52a of the light intensity distributions shown in (b) of FIG. 5B is converted into the excitation beam by lens region 21a with the focal point and astigmatism. Then, the light (i.e., the excitation beam) forms an intensity distribution with width D2 on light-emitting surface 33.

The incident light (52f and 52g) other than incident light 52a of the light intensity distributions shown in (b) of FIG. 5B is converted into the excitation beams by the lens regions (21f and 21g). The excitation beams are focused at respective focal points, which are set so that the excitation beams have widths (D2') smaller than D2 on light-emitting surface 33. That is, the intensity distributions of light (i.e., the excitation beams) with widths D2' is formed on light-emitting surface 33. In other words, the other incident light beams (52f and 52g) overlap each other within beam width D2.

In this manner, incident light 52 is converted by the plurality of lens regions 21 of optical element 20 (i.e., optical functional part 22) into the excitation beams, which overlap each other on light-emitting surface 33 of phosphor element 30. Since the beams overlapping each other on light-emitting surface 33 of phosphor element 30 are uniformized, the intensity distribution of excitation light 54 as a whole is uniformized. This forms the light intensity distribution with beam width D1 and beam width D2 along the two orthogonal axes on light-emitting surface 33 of phosphor element 30. With reference to FIGS. 5A and 5B, only the two orthogonal axes have been described. In practice, the excitation beams from other lens regions, that is out of the two axes, are also designed to overlap each other, which further increases the effect of uniformization.

In this embodiment, semiconductor light-emitting element 11 is disposed so that stripe width W of optical waveguide 11a extends along coordinate axis 96. Stripe width W of optical waveguide 11a may extends along coordinate axis 95, which provides the same or similar advantages.

In this embodiment, phosphor element 30 is disposed almost in parallel to optical element 20. The configuration is not limited thereto. Phosphor element 30 may be inclined about coordinate axis 95 or coordinate axis 96. At this time, the beam extending the slope may have a width determined by the focal point and astigmatism applied to lens region 21a.

In this embodiment, single lens region 21a has the focal point and is astigmatic. Alternatively, the other lens regions may have focal points and be astigmatic so that the excitation beams from the lens regions overlap each other to have width D1 and width D2. This provides an intensity distribution of excitation light 54, which is uniformized in wider ranges of width D1 and width D2.

Semiconductor light-emitting element 11 may be a multi-mode laser, in which the light emitted from semiconductor light-emitting element 11 has a greater angle of radiation along the first axis (i.e., coordinate axis 95). In this case, the direction of the first axis is associated with the single mode, whereas the direction of the second axis (i.e., coordinate axis 96) orthogonal to the first axis is associated with the multi-mode. The light is more focused along the first axis than along the second axis. The astigmatism of the plurality of lens regions 21 of optical element 20 facilitates designing of beam width D2 along the second axis to be smaller than beam width D1 along the first axis. This increases the design range of the elongated beam profile with the uniformized light intensity distribution.

As described above, light source device 1 according to this embodiment efficiently converts the light emitted from semiconductor light-emitting element 11 into excitation light 54 with a uniform intensity distribution. This reduces a decrease in the light emission efficiency of phosphor element 30 caused by the heat generated from excitation light 54. In addition, no optical rod or similar means is used to form excitation light 54 with desired widths and a uniform light intensity distribution. Accordingly, a small-size light source device is achieved.

Variation 1 of Embodiment 1

Figure 6A:
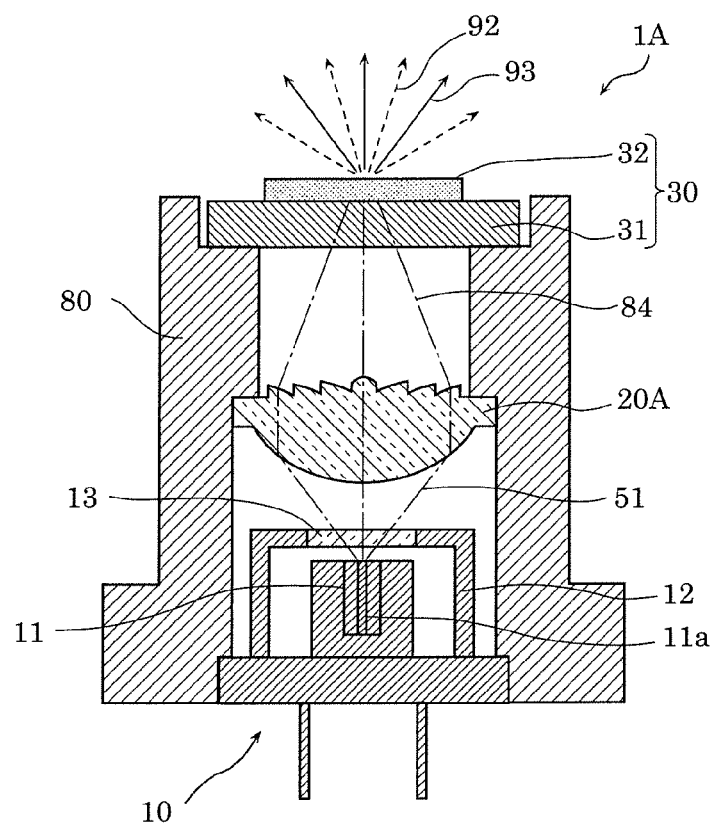
FIG. 6A illustrates a configuration of a light source device according to Variation 1 of Embodiment 1 of the present disclosure.
Figure 6B:
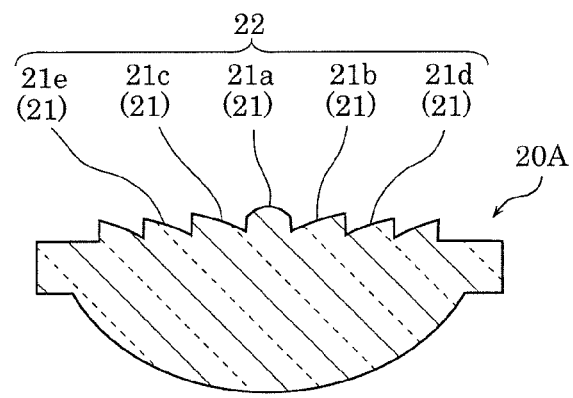
FIG. 6B is a cross-sectional view illustrating a configuration of an optical element used for the light source device according to Variation 1 of Embodiment 1 of the present disclosure.

Then, light source device 1A according to Variation 1 of Embodiment 1 of the present disclosure will be described with reference to FIGS. 6A and 6B. FIG. 6A is a cross-sectional view illustrating a configuration of light source device 1A according to Variation 1 of Embodiment 1 of the present disclosure. FIG. 6B is a cross-sectional view illustrating a configuration of optical element 20A in this light source device 1A. Light source device 1A according to this variation has almost the same configuration as light source device 1 according to Embodiment 1 described above. Differences from light source device 1 according to Embodiment 1 will thus be mainly described below in this variation.

As shown in FIG. 6A, light source device 1A according to this variation includes holder 80. Holder 80 holds semiconductor light-emitting element 11 and phosphor element 30. When semiconductor light-emitting element 11 and phosphor element 30 are placed in predetermined positions of holder 80, the emitting optical axis of light 51 emitted from semiconductor light-emitting element 11 agrees with the optical axis of optical element 20A. At this time, the intensity distribution of excitation light 54 is set to be formed in a predetermined position of the light-emitting surface of phosphor element 30.

As shown in FIG. 6B, optical element 20A is in the shape of a lens with a flat peripheral edge. On the surface of optical element 20A, which serves as optical functional part 22, a plurality of lens regions 21 (21a, 21b, 21c, 21d, 21e, ... ) are formed. On the surface of optical element 20A, which is opposite to the surface serving as optical functional part 22, a convex lens in a sphere or asphere shape is formed. That is, in optical element 20A according to this variation, lens 120 and optical functional part 22 of optical element 20 according to Embodiment 1 described above are integrally formed. The element also includes a convex lens that changes the angle of divergence of the light emitted from semiconductor light-emitting element 11. The light transmitted through the convex lens is incident on the plurality of lens regions 21.

Like light source device 1 according to Embodiment 1 described above, light source device 1A according to this variation with such a configuration efficiently converts the light emitted from semiconductor light-emitting element 11 into the light with a uniform intensity distribution. This reduces a decrease in the light emission efficiency of phosphor element 30 caused by the heat generated from excitation light 54.

In light source device 1A according to this variation as well, no optical rod or similar means is used to form excitation light 54 with beam widths and a uniform light intensity distribution. Accordingly, a small-size light source device is achieved. In particular, this variation requires a shorter distance from semiconductor light-emitting device 10 to phosphor element 30 than light source device 1 according to Embodiment 1 described above. A further miniaturization of the light source device is possible.

As compared to light source device 1 according to Embodiment 1 described above, this variation requires a smaller number of members, and thus provides lower-price light source device 1A, which is more easily adjustable. Optical element 20A may be fabricated by integral molding using, for example, a mold like a usual method of molding glass lenses. It is advantageous if antireflective films, which are multilayers of dielectric films, are formed on both the surfaces of optical element 20A.

Variation 2 of Embodiment 1

Figure 7:
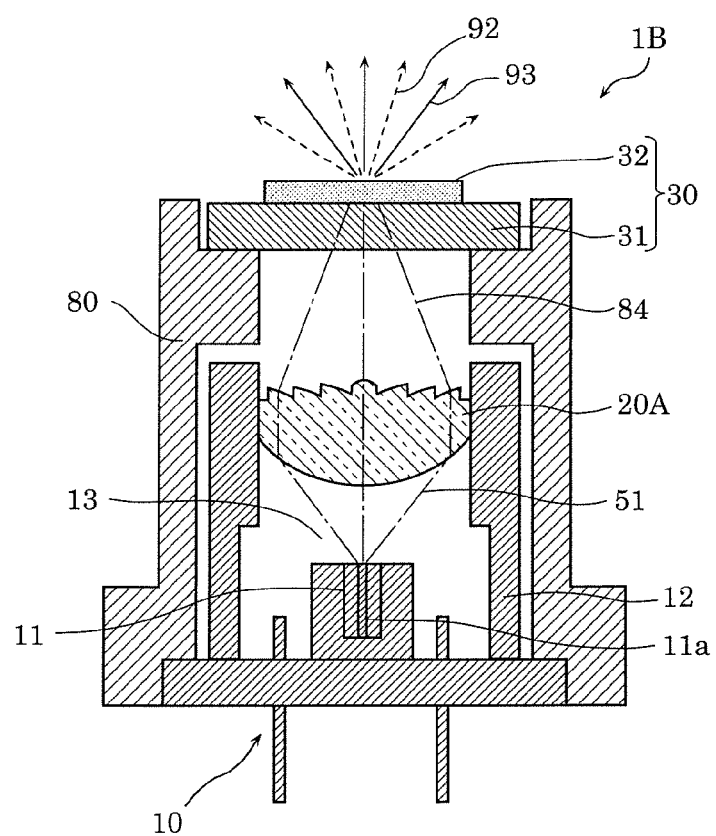
FIG. 7 illustrates a configuration of a light source device according to Variation 2 of Embodiment 1 of the present disclosure.

Then, light source device 1B according to Variation 2 of Embodiment 1 of the present disclosure will be described with reference to FIG. 7. FIG. 7 illustrates a configuration of light source device 1B according to Variation 2 of Embodiment 1 of the present disclosure. Light source device 1B according to this variation has almost the same configuration as light source device 1A according to Variation 1 of Embodiment 1 described above. Differences from light source device 1A according to Variation 1 of Embodiment 1 will thus be mainly described below in this variation. In this variation, optical element 20A has the same or similar configuration as optical element 20A according to Variation 1 of Embodiment 1. As shown in FIG. 7, this variation differs from Variation 1 in that optical element 20A is located in the position of window glass 13 of cap 12 in semiconductor light-emitting device 10 shown in FIG. 6A.

Like light source device 1A according to Variation 1 described above, light source device 1B according to this variation with such a configuration efficiently converts the light emitted from semiconductor light-emitting element 11 into the light with a uniform intensity distribution. This reduces a decrease in the light emission efficiency of phosphor element 30 caused by the heat generated from excitation light 54.

In light source device 1B according to this variation as well, no optical rod or similar means is used to form excitation light 54 with desired widths and a uniform light intensity distribution. Accordingly, a small-size light source device is achieved.

In this variation, window glass 13 is replaced with optical element 20A, which reduces transmission losses at window glass 13. This allows for more efficient conversion of light 51 emitted from semiconductor light-emitting element 11 into excitation light.

Embodiment 2

Figure 8:
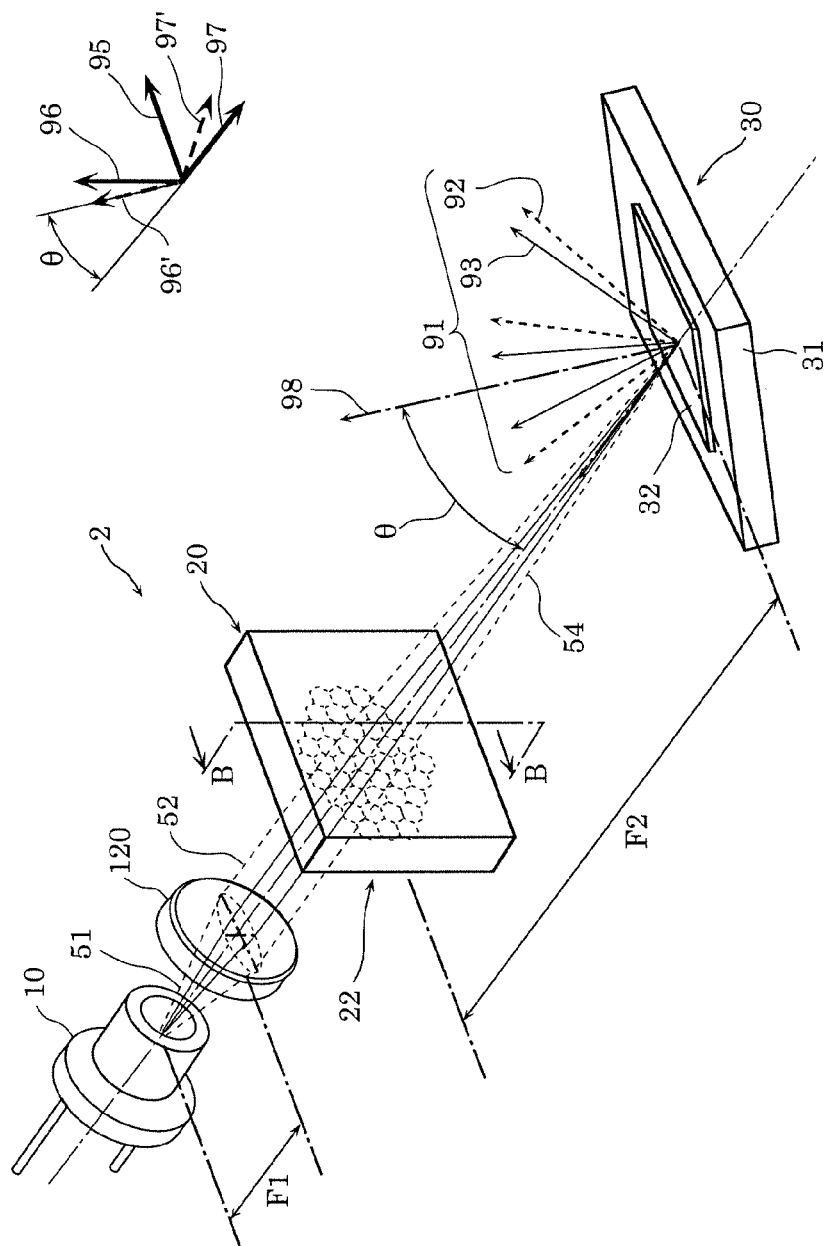
FIG. 8 illustrates a configuration of a light source device according to Embodiment 2 of the present disclosure.

Next, light source device 2 according to Embodiment 2 of the present disclosure will be described with reference to FIG. 8. FIG. 8 illustrates a configuration of light source device 2 according to Embodiment 2 of the present disclosure.

Light source device 2 according to this embodiment differs from light source device 1 according to Embodiment 1 shown in FIG. 1 in the following respect. Phosphor element 30 is disposed so that the light-emitting surface of phosphor element 30 is inclined from the plane including the optical axis (i.e., the traveling direction) of excitation light 54 as a normal line. Specifically, phosphor element 30 is disposed so that the light-emitting surface is inclined with respect to the central optical axis of optical element 20. Accordingly, excitation light 54 is incident on phosphor element 30 at a predetermined incident angle.

In this embodiment, phosphor element 30 is inclined about coordinate axis 95 (i.e., the first axis) as a rotation axis. Specifically, when phosphor element 30 rotates about coordinate axis 95 as the rotation axis, normal line 98 of the light-emitting surface of phosphor element 30 forms an angle of θ with the direction opposite to the traveling direction of excitation light 54 (i.e., coordinate axis 97). That is, excitation light 54 is incident on phosphor element 30 at an incident angle of θ. Phosphor element 30 is excited by the light with the intensity distribution changed by optical element 20 as excitation light 54, and emits fluorescence.

Phosphor element 30 includes support member 31 and phosphor layer 32 formed on support member 31. The phosphor contained in phosphor layer 32 is made of the same material as in Embodiment 1. It is advantageous if support member 31 is made of a material with a high thermal conductivity. Support member 31 may be, for example, a polycrystalline substrate made of a ceramic material such as AlN or diamond, a crystal substrate made of Si or SiC, or a metal substrate such as Al or Cu.

Ag or an Ag alloy (e.g., an alloy of Ag and Cu or Ag and Pt) or a dielectric reflective film may be further formed on the surface of support member 31, which is provided with phosphor layer 32. The dielectric reflective film may a multilayer obtained by sputtering or vapor deposition of a plurality of dielectric materials (e.g., materials such as $SiO_2$, $TiO_2$, $Al_2O_3$, $Ta_2O_3$, and $Nb_2O_5$) with different refractive indexes. Alternatively, Ag or an Ag alloy may be formed on support member 31, and a composite reflective film as a multilayer of dielectric films may be formed on the Ag or the Ag alloy. This configuration efficiently reflects excitation light 54, which has reached the surface of support member 31 provided with phosphor layer 32, and the light, which has been emitted from and phosphor layer 32. Then, the light can be converted into radiation light 91 (i.e., scattered light 92 and fluorescence 93), which is emitted from phosphor layer 32 along normal line 98.

Semiconductor light-emitting device 10 according to this embodiment is the same as semiconductor light-emitting device 10 used in Embodiment 1 (see FIG. 2). Semiconductor light-emitting element 11 is disposed inside semiconductor light-emitting device 10 so that stripe width W of optical waveguide 11a extends along coordinate axis 96. That is, semiconductor light-emitting element 11 is disposed so that the length (i.e., stripe) of optical waveguide 11 extends along coordinate axis 97. Semiconductor light-emitting element 11 is a laser element (multi-mode laser) that outputs a multi-mode laser beam.

Now, a problem will be described, where a single lens without aberration collects the light from a laser element. The angles of radiation of the light emitted from the laser element are different in two orthogonal direction as described above. If being collected with a single lens, the light with such a radiation distribution is more focused in the direction with a greater angle of radiation, and less focused in the direction with a smaller angle of radiation in the light spot formed on the light collecting surface. In the case of a multi-mode laser with stripe width W, the light along the stripe width cannot be focused at (β×W) or lower, where the single lens has an optical magnification of β, and is focused too much in the direction with a greater angle of radiation. Thus, if a laser beam of the multi-mode laser is as excitation light incident on a phosphor element, the widths of excitation light cannot be freely designed in the intensity distribution on the light-emitting surface of the phosphor element.

If the phosphor element is inclined with respect to the optical axis of excitation light, the widths of excitation light on the light-emitting surface of the phosphor element extend along the slope of the phosphor element. Thus, if a laser beam is obliquely incident on the light-emitting surface of the phosphor element, it becomes more difficult to freely design the widths of the laser beam, which becomes as excitation light.

To solve the problem, this embodiment provides a configuration and a design method of optical element 20. Optical element 20 according to this embodiment will be described with reference to FIG. 8 together with FIGS. 9 and 10.

As shown in FIG. 8, optical element 20 is disposed between semiconductor light-emitting device 10 and phosphor element 30. Lens 120 is disposed between semiconductor light-emitting device 10 and optical element 20. Lens 120 has the same function as in Embodiment 1.

Like optical element 20 according to Embodiment 1, optical functional part 22 of optical element 20 according to this embodiment includes a plurality of lens regions 21. In Embodiment 1, optical functional part 22 is formed on the surface facing phosphor element 30. In this embodiment, optical functional part 22 is formed on the surface opposite to phosphor element 30, that is, the surface facing semiconductor light-emitting device 10. Such a configuration reduces the distance from optical element 20 to phosphor element 30. Further miniaturization of light source device 2 is thus possible.

Figure 9:
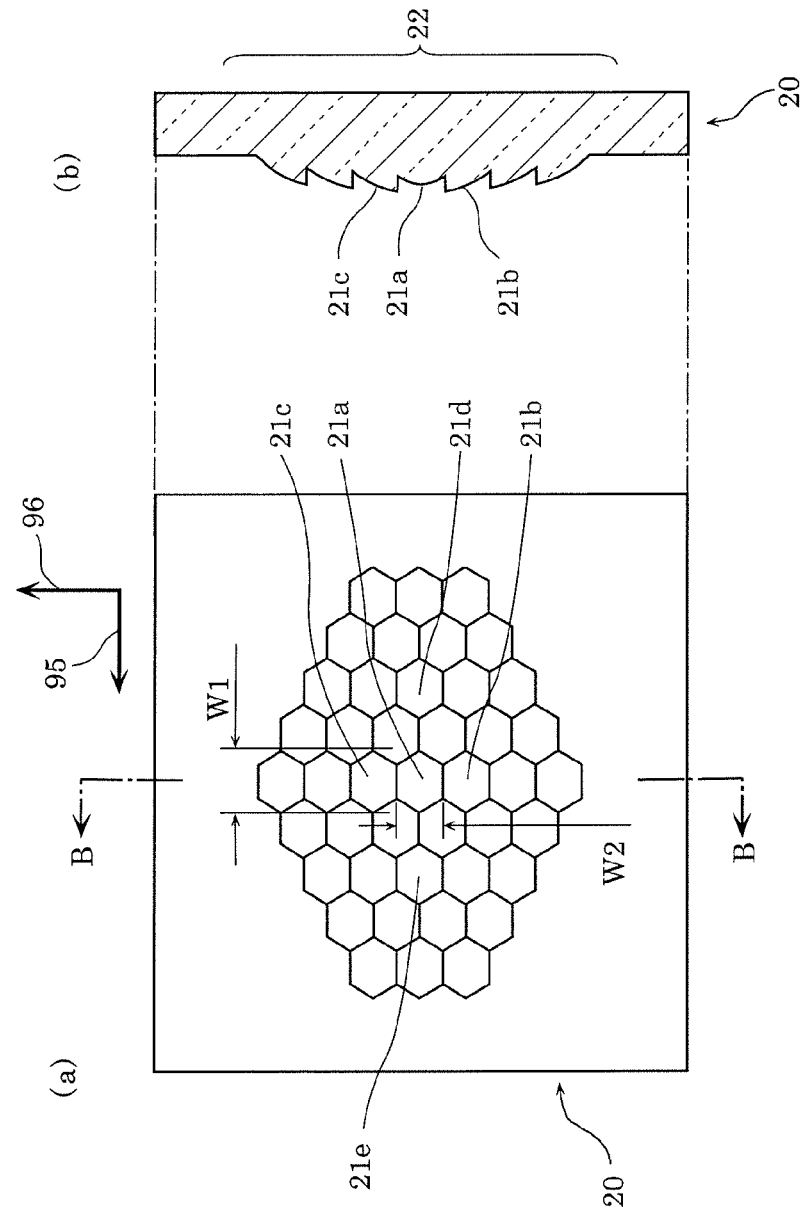
FIG. 9 illustrates a configuration of an optical element in the light source device according to Embodiment 2 of the present disclosure.

Next, a configuration of optical element 20 according to this embodiment will be described with reference to FIG. 9. FIG. 9 illustrates the configuration of optical element 20 in light source device 2 according to Embodiment 2 of the present disclosure. Section (a) of FIG. 9 is a plan view of optical element 20 as viewed from the side facing semiconductor light-emitting device 10. Section (b) of FIG. 9 is a cross-sectional view taken along line B-B of (a) of FIG. 9. Note that the cross-section taken along line B-B of (a) of FIG. 9 corresponds to the cross-section taken along line B-B of FIG. 8.

As shown in (a) and (b) of FIG. 9, optical element 20 includes as optical functional part 22, a plurality of lens regions 21 (21a, 21b, 21c, 21d, 21e, ...) divided into those along coordinate axis 95 and those along coordinate axis 96. The plurality of lens regions 21 are divisional regions (unit regions) of optical functional part 22. As in Embodiment 1, optical element 20 changes the intensity distribution of light 51 emitted from semiconductor light-emitting element 11 using the plurality of lens regions 21 (i.e., optical functional part 22).

As in Embodiment 1, the plurality of lens regions 21 are parts of a lens, each of which functions to collect light. That is, each lens region 21 functions to individually converge the light incident on optical element 20.

Each lens region 21 has a hexagonal shape in a plan view with widths W1 and W2. W1 is a width along coordinate axis 95, whereas W2 is a width along coordinate axis 96. Width W1 is equal to width W2, but may be inequal.

It is advantageous if antireflective films are formed on the surface of optical element 20. Namely, one surface is provided with optical functional part 22 (i.e., the surface on which light 52 is incident), and the other is opposite to the surface provided with optical functional part 22 (i.e., the surface emitting excitation light 54). The antireflective films may be dielectric reflective films, each of which is a multilayer obtained by sputtering or vapor deposition of a plurality of dielectric materials (e.g., materials such as $SiO_2$, $TiO_2$, $Al_2O_3$, $Ta_2O_5$, and $Nb_2O_5$) with different refractive indexes. The formation of the antireflective films on optical element 20 allows for efficient conversion of incident light 52 into excitation light 54.

Figure 10:
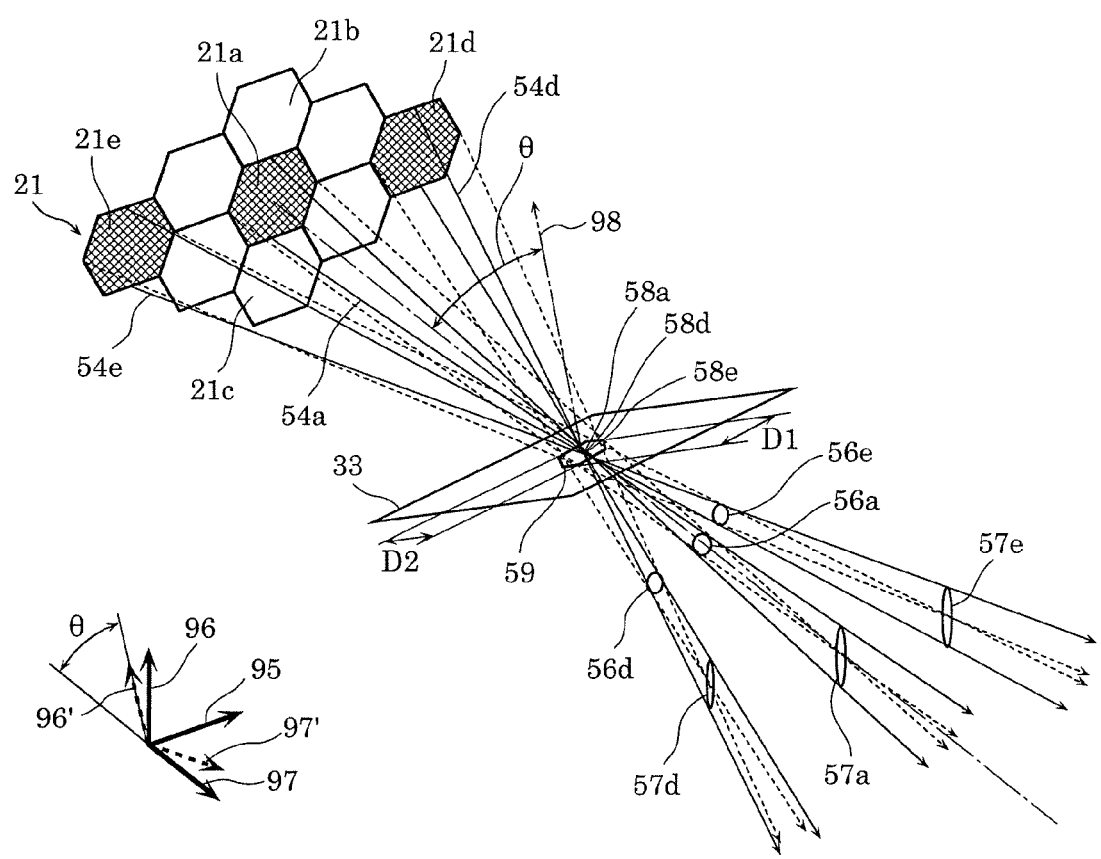
FIG. 10 illustrates a function of the optical element in the light source device according to Embodiment 2 of the present disclosure.

Next, a function of the plurality of lens regions 21 (i.e., optical functional part 22) of optical element 20 according to this embodiment will be described with reference to FIG. 10. FIG. 10 illustrates a function of optical element 20 in light source device 2 according to Embodiment 2 of the present disclosure. FIG. 10 illustrates how to collect excitation light 54 (i.e., respective excitation beams) emitted from the plurality of lens regions 21.

FIG. 10 shows only the respective lens regions 21 (the lens shape and the surface facing the plurality of lens regions 21 are not shown). FIG. 10 shows how to collect excitation beams 54a, 54d, and 54e from lens regions 21a, 21d, and 21e of the plurality of lens regions 21. In FIG. 10, light-emitting surface 33 represents the light-emitting surface of phosphor element 30 in FIG. 8. Light-emitting surface 33 is defined as the surface on which excitation light 54 is incident, that is, the surface emitting the fluorescence of phosphor layer 32.

As shown in FIG. 10, lens regions 21a, 21d, and 21e are astigmatic in addition to the function of focusing light behind light-emitting surface 33. Lens regions 21a, 21d, and 21e are astigmatic along coordinate axis 95 (i.e., the first axis) and coordinate axis 96 (i.e., the second axis). Light 52 incident on lens regions 21a, 21d, and 21e (see FIG. 8) is converted into excitation beams 54a, 54d, and 54e, which are collected to form circles of least confusion and focal lines due to the astigmatism applied to these lens regions. The circles (56a, 56d, and 56e) of least confusion are formed behind light-emitting surface 33. First focal lines 57a, 57d, and 57e and second focal lines 58a, 58d, and 58e sandwich the circles (56a, 56d, and 56e) of least confusion, respectively, behind and in front of the circles, respectively. At this time, circles 56a, 56d, and 56e of least confusion associated with excitation beams 54a, 54d, and 54e, respectively, are located in different positions. First focal lines 57a, 57d, and 57e are formed farther from light-emitting surface 33, whereas second focal lines 58a, 58d, and 58e are formed closer to light-emitting surface 33.

Excitation beams 54a, excitation beam 54d, and excitation beam 54e partially or entirely overlap each other on light-emitting surface 33. The locations of first focal lines 57a, 57d, and 57e correspond to the positions in which the rays along coordinate axis 95 (i.e., the first axis) out of light 52 incident on lens regions 21a, 21d, and 21e are most focused. The locations of second focal lines 58a, 58d, and 58e correspond to the positions in which the rays along coordinate axis 96 (i.e., the second axis) out of incident light 52 are most focused.

Although not shown in the figures, lens regions 21 (21b, 21c, ... ) other than lens regions 21a, 21d, and 21e also are astigmatic in addition to the function of collecting light. Light 52 incident on the other lens regions 21 (21b, 21c, ... ) is converted into excitation light 54, which forms circles of least confusion and focal lines. Circles 56b, 56c, ... of least confusion are formed behind light-emitting surface 33 in different positions. First focal line 57b, 57c, ... are formed farther from light-emitting surface 33, whereas second focal line 58b, 58c, ... are formed closer to light-emitting surface 33. The respective excitation light beams (excitation light 54) overlap each other on light-emitting surface 33.

In this manner, the light incident on the plurality of lens regions 21 is collected by the plurality of lens regions 21 to become the excitation beams, which overlap each other on light-emitting surface 33. Accordingly, excitation light spot 59 with width D1 along coordinate axis 95 and width D2 along coordinate axis 97' (i.e., the third axis) is formed on light-emitting surface 33.

Optical element 20 (i.e., optical functional part 22) according to this embodiment is astigmatic so that second focal lines 58a, 58d, and 58e formed by converted excitation light 54 are located on or very close to light-emitting surface 33 of phosphor element 30.

With this configuration, the rays of excitation light 54 in the direction (i.e., along the stripe width of semiconductor light-emitting element 11), in which the laser beam is radiated at a smaller angle, are most focused on light-emitting surface 33 of phosphor element 30. The rays of excitation light 54, in the direction in which the laser beam is radiated at a greater angle, are most focused in a position farther from light-emitting surface 33 of phosphor element 30. Accordingly, the intensity distribution of the excitation light on light-emitting surface 33 of phosphor element 30 can be designed to have minimum width D2 along coordinate axis 97' and width D1, which is almost equal to width D2, along coordinate axis 95.

Figure 11:
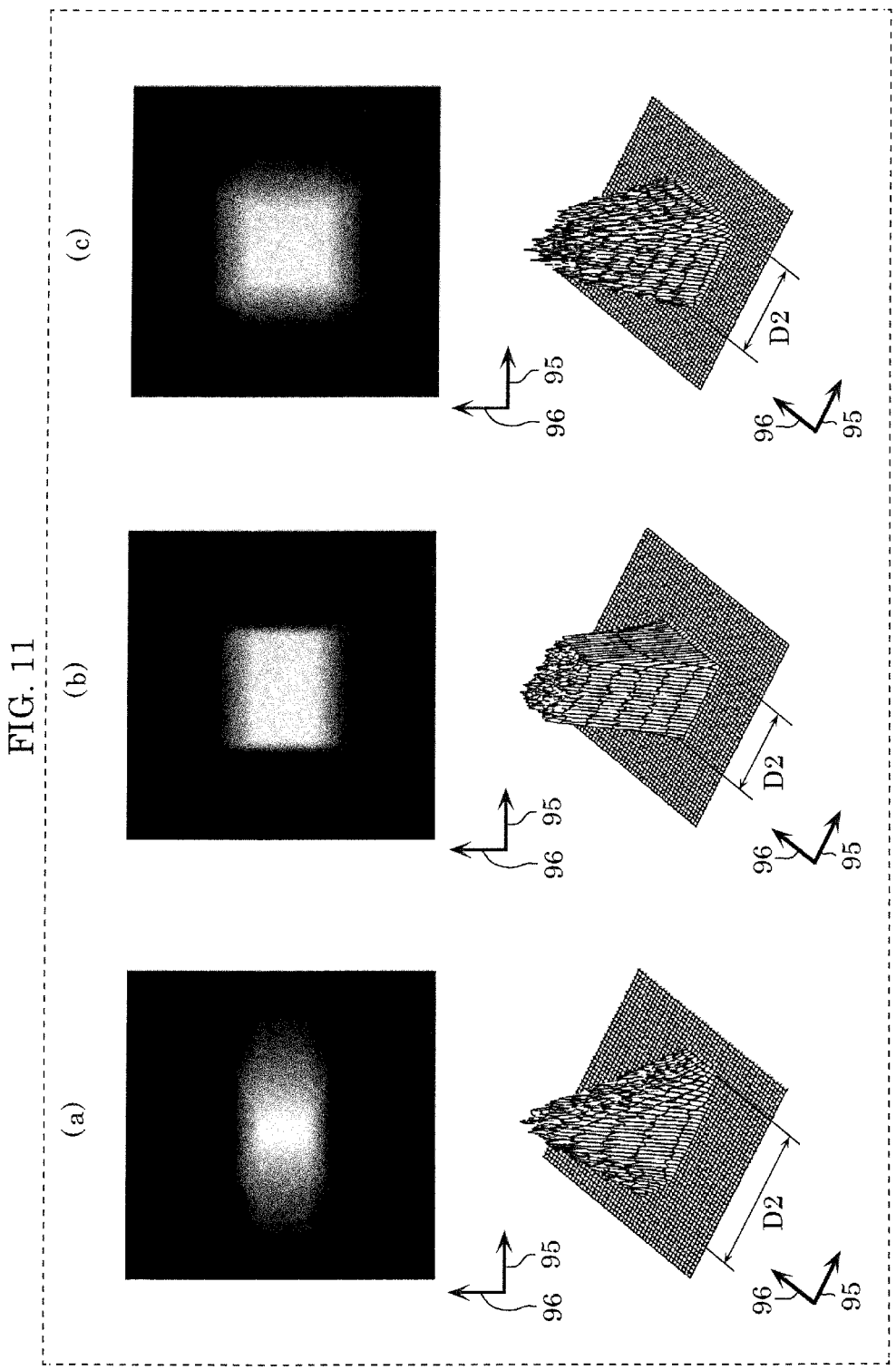
FIG. 11 illustrates a design example of the intensity distribution of excitation light on a light-emitting surface of a phosphor element in the light source device according to Embodiment 2 of the present disclosure.

Next, a design example of the intensity distribution of excitation light 54 on light-emitting surface 33 of phosphor element 30 in light source device 2 according to this embodiment will be described with reference to FIG. 11. FIG. 11 illustrates the design example of the intensity distribution of excitation light 54 on light-emitting surface 33 of phosphor element 30 in light source device 2 according to Embodiment 2. In FIG. 11, the intensity distribution of excitation light 54 on the light-emitting surface of phosphor element 30 are shown as a planer intensity distribution (the upper figure) and a three-dimensional intensity distribution (the lower figure).

Here, the width of excitation light 54 (i.e., the laser beam) is defined as the width on the cross-section taken at the intensity of 13.5% ($1/e^2$) with respect to the peak intensity in the light intensity distribution.

In the design example according to this embodiment, wavelength λ of the laser element is 450 nm, stripe width W is 0.03 mm, and angle θ of excitation light 54 incident on phosphor element 30 is 70°, optical magnification β is 4.5 when light is focused on light-emitting surface 33 of phosphor element 30. The optical magnification may be obtained by the equation 13=F2/F1 using F1 and F2 in FIG. 8. In this embodiment, F1 represents the focal length of lens 120, whereas F2 represents the optical path length along the optical axis of excitation light 54 from optical functional part 22 of optical element 20 to the light-emitting surface of phosphor element 30. Divisional width W1 of each lens region 21 of optical element 20 shown in FIG. 9 is 1.2 mm.

Beam width D (i.e., the width along coordinate axis 97') on light-emitting surface 33 of phosphor element 30, where the excitation light is most focused in the stripe direction, is obtained by the following equation.

$$D = W \times \beta / \cos(\theta) = W \times (F2/F1) / \cos(\theta)$$

If the design values of the design example described above are input to this equation, D=0.39 mm is obtained.

Section (a) of FIG. 11 illustrates the intensity distribution of excitation light 54 on light-emitting surface 33 of phosphor element 30, where none of the plurality of lens regions 21 of optical element 20 is astigmatic. If none of the plurality of lens regions 21 is astigmatic, excitation light spot 59 on fluorescent surface 33 has an intensity distribution with larger width D2, smaller width D1, and a smaller uniformized area, as shown in (a) of FIG. 11.

By contrast, Sections (b) and (c) of FIG. 11 illustrate the intensity distribution of excitation light 54 on light-emitting surface 33 of phosphor element 30, where the plurality of lens regions 21 of optical element 20 are astigmatic.

Section (b) of FIG. 11 further illustrates the intensity distribution, where second focal lines 58a, 58d, and 58e of excitation light 54 are located on light-emitting surface 33 of phosphor element 30, and the positions of first focal lines 57a, 57d, and 57e of excitation light 54 are adjusted. In this case, as shown in (b) of FIG. 11, D1=D2=0.40 mm is obtained, which are almost approximate to design value D. As compared to (a) of FIG. 11, a sufficiently large area is uniformized.

Section (c) of FIG. 11 illustrates the intensity distribution, where second focal lines 58a, 58d, and 58e of excitation light 54 are slightly apart from light-emitting surface 33 of phosphor element 30, and the positions of first focal lines 57a, 57d, and 57e of excitation light 54 are adjusted. In this case, as shown in (c) of FIG. 11, D1=D2=0.50 mm is obtained. That is, excitation light 54 is obtained, which has a uniformized intensity distribution with beam widths different from those in (b) of FIG. 11.

In this manner, in light source device 2 according to this embodiment, the minimum beam width in a designable intensity distribution of the excitation light is obtained by the equation: $D = W \times \beta / \cos(\theta) = W \times (F2/F1) / \cos(\theta)$. On the other hand, in light source device 2 according to this embodiment, the maximum beam width in a designable intensity distribution of the excitation light may be assumed to fall within the range capable of applying the first focal line of excitation light 54. Thus, the maximum beam width is smaller than divisional width W1 of each lens region 21 of optical element 20. In this design example, the beam widths are smaller than 1.2 mm.

The intensity distribution of excitation light 54 in light source device 2 according to this embodiment may be designed in any method satisfying the expressions D<D2<W1 and D<D1<W1.

Within this range, the intensity distribution of excitation light 54 is freely designed to have almost equal beam widths D1 and D2.

In light source device 2 according to this embodiment, each of the plurality of lens regions 21 of optical element 20 has the hexagonal shape. As shown in (b) and (c) of FIG. 11, the intensity distribution of excitation light 54 is in the shape of a truncated quadrangular pyramid with two almost parallel base sides forming beam width D1 and two almost parallel base sides forming beam width D2, without depending on the shape of each lens region 21.

Such an intensity distribution of excitation light 54 facilitates the designing of a wider uniformized area on light-emitting surface 33 of phosphor element 30.

In light source device 2 according to this embodiment, the design values are mere design examples according to this embodiment, and not limited thereto.

For example, stripe width W of semiconductor light-emitting element 11 may be reduced to decrease the beam widths in the intensity distribution of excitation light 54 on light-emitting surface 33 of phosphor element 30. Alternatively, with a decrease in optical magnification β (=F2/F1) or a decrease in angle θ of excitation light 54 incident on phosphor element 30, the beam width in the intensity distribution of excitation light 54 may decrease on light-emitting surface 33 of phosphor element 30. Stripe width W of semiconductor light-emitting element 11 may fall, for example, within a range from 0.001 mm to 0.1 mm, particularly from 0.01 mm to 0.06 mm. Angle θ of the light on phosphor element 30 may fall, for example, within a range from 0° to 85°.

As described above, light source device 2 according to this embodiment efficiently converts the light emitted from semiconductor light-emitting element 11 into excitation light 54 with a uniform intensity distribution. At the same time, a small-size light source device is achieved, which facilitates designing of the intensity distribution of excitation light 54.

Variation 1 of Embodiment 2

Figure 12:
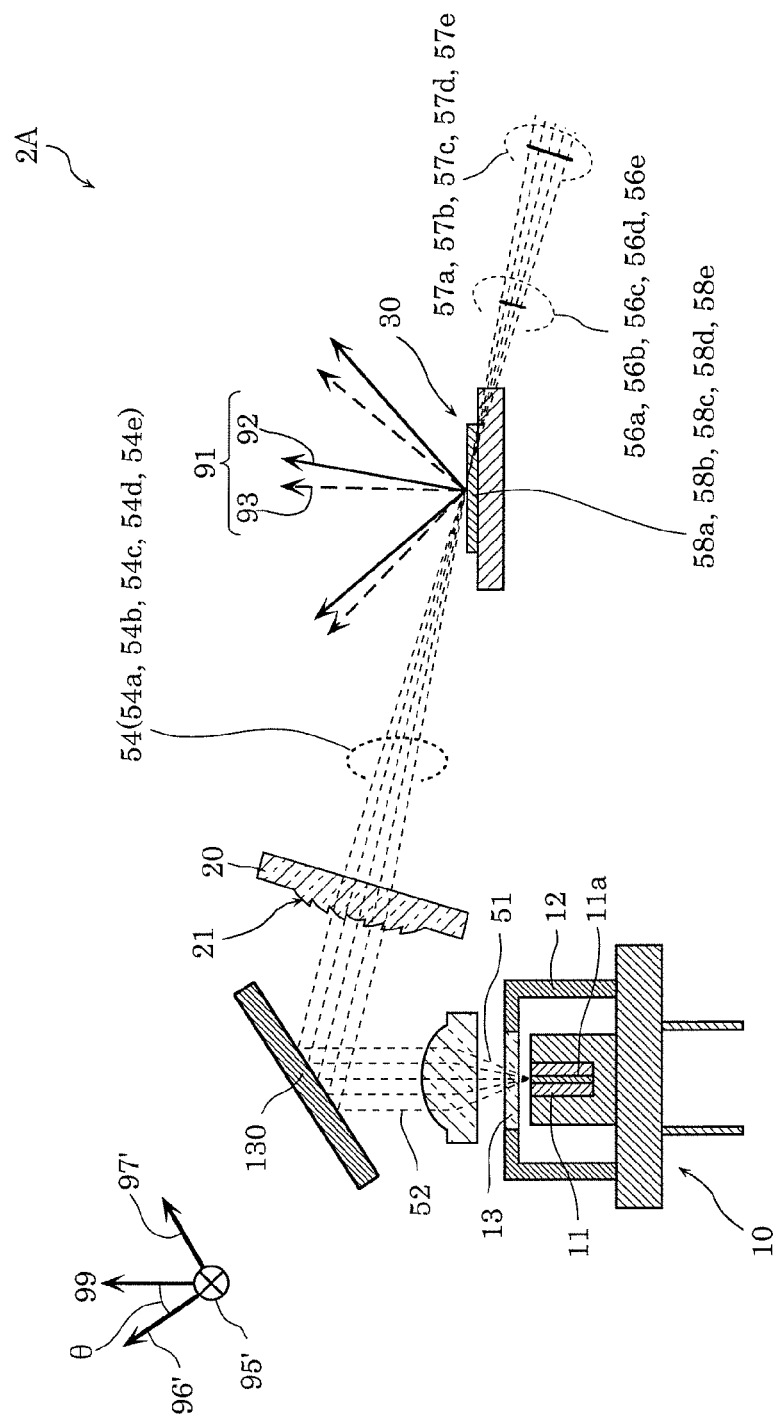
FIG. 12 illustrates a configuration of a light source device according to Variation 1 of Embodiment 2 of the present disclosure.

Then, light source device 2A according to Variation 1 of Embodiment 2 of the present disclosure will be described with reference to FIG. 12. FIG. 12 illustrates a configuration of light source device 2A according to Variation 1 of Embodiment 2 of the present disclosure. Light source device 2A according to this variation has almost the same configuration as light source device 2 according to Embodiment 2. Differences from light source device 2 according to Embodiment 2 will thus be mainly described below in this variation.

As shown in FIG. 12, in light source device 2A according to this variation, semiconductor light-emitting element 11 is disposed so that the stripe width of optical waveguide 11a is orthogonal to coordinate axis 95'. Semiconductor light-emitting element 11 emits light 51 along coordinate axis 99.

Light source device 2A according to this variation employs mirror 130, which reflects light 51 emitted from semiconductor light-emitting device 10 (i.e., semiconductor light-emitting element 11). Mirror 130 is configured to reflect light 52 incident from semiconductor light-emitting device 10 and direct the light toward phosphor element 30. Specifically, mirror 130 is disposed so that the normal line of mirror 130 is inclined at angle θ about coordinate axis 95' as the rotation axis with respect to the optical axis (i.e., coordinate axis 99) of emitted light 51.

Optical element 20 has the same configuration as in Embodiment 2. Optical element 20 is disposed between mirror 130 and phosphor element 30 so that light 52 is incident on the principal surface of optical element 20 almost perpendicularly.

Like in Embodiment 2 described above (see FIG. 10), light 52 incident on optical element 20 is collected by the plurality of lens regions 21 (21a, 21b, 21c, 21d, and 21e) of optical element 20 to become excitation light 54 (excitation beams 54a, 54b, 54c, 54d, and 54e) to irradiate phosphor element 30. In this variation as well, each of the plurality of lens regions 21 is astigmatic. The excitation beams (i.e., excitation light 54) form circles 56a, 56b, 56c, 56d, and 56e of least confusion, and first focal lines 57a, 57b, 57c, 57d, and 57e and second focal lines 58a, 58b, 58c, 58d, and 58e behind and in front of the circles, respectively. The excitation beams partially or entirely overlap each other on the light-emitting surface of phosphor element 30.

In the plurality of lens regions 21, the light incident along coordinate axis 97' is most focused on the second focal lines. As shown in FIG. 12, in this variation, second focal lines 58a, 58b, 58c, 58d, and 58e are located almost on the light-emitting surface of phosphor element 30. Second focal lines 58a, 58b, 58c, 58d, and 58e of the excitation beams (i.e., excitation light 54) partially or entirely overlap each other.

As light 52 incident on optical element 20, light 51 emitted from semiconductor light-emitting element 11 is incident at a greater angle of radiation along coordinate axis 95', and at a smaller angle of radiation along coordinate axis 97' (i.e., multi-mode light with stripe width W).

In light source device 2A according to this variation, phosphor element 30 is disposed so that the direction of the normal line of the light-emitting surface of phosphor element 30 almost agrees with coordinate axis 99 of light source device 2. Like in Embodiment 2 described above, phosphor element 30 may also be inclined in this variation. Arrangement of phosphor element 30 as in this variation such that the direction of the normal line of the light-emitting surface almost agrees with coordinate axis 99 allows for perpendicular radiation of radiation light 91 to the reference plane. It is more advantages in forming a light source device, if phosphor element 30 is disposed as in this variation.

As described above, like in Embodiment 2, light source device 2A according to this variation efficiently converts the light emitted from semiconductor light-emitting element 11 into excitation light 54 with a uniform intensity distribution. At the same time, a small-size light source device is achieved, which facilitates designing of the intensity distribution of excitation light 54.

The configuration according to this variation requires a shorter distance between semiconductor light-emitting device 10 and phosphor element 30 than in Embodiment 2. Accordingly, a smaller-size light source device is achieved.

Variation 2 of Embodiment 2

Figure 13:
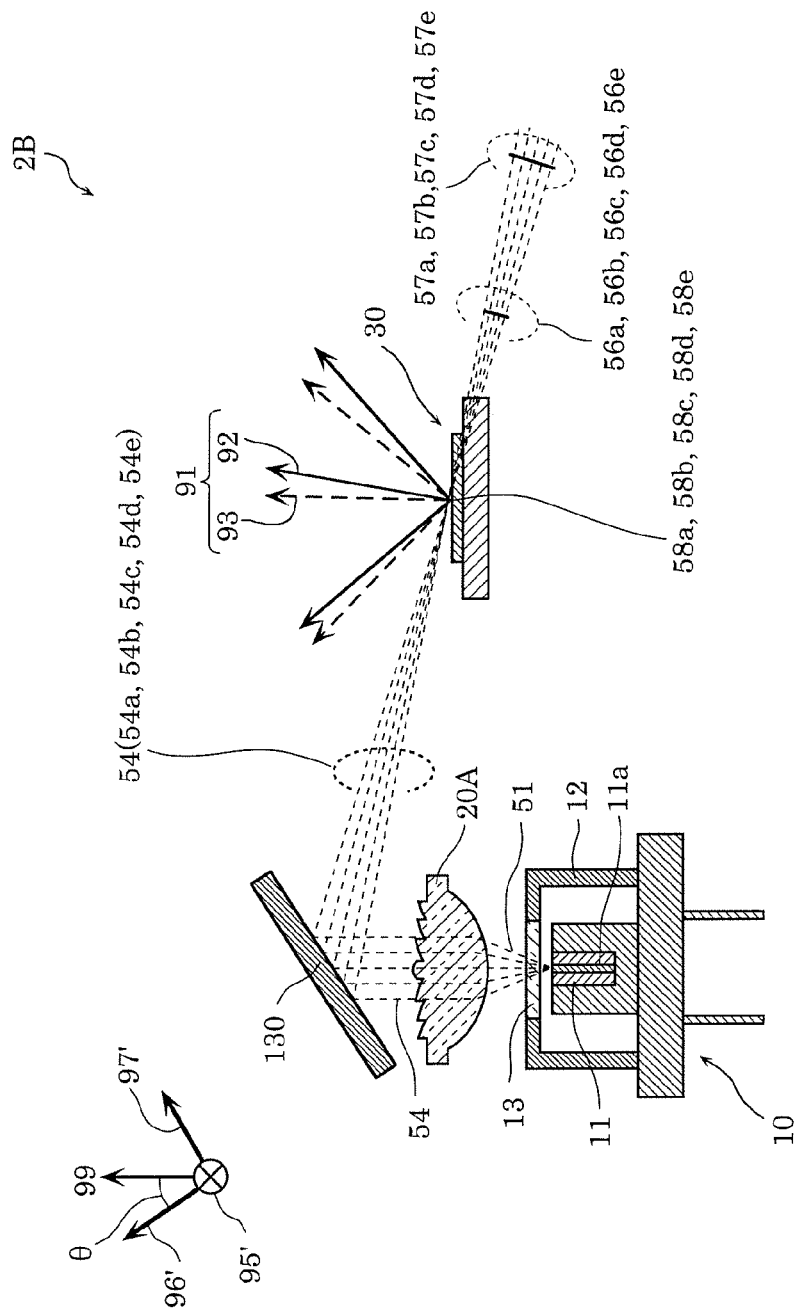
FIG. 13 illustrates a configuration of a light source device according to Variation 2 of Embodiment 2 of the present disclosure.

Then, light source device 2B according to Variation 2 of Embodiment 2 of the present disclosure will be described with reference to FIG. 13. FIG. 13 illustrates a configuration of light source device 2B according to Variation 2 of Embodiment 2 of the present disclosure. Light source device 2B according to this variation has almost the same configuration as light source device 2A according to Variation 1 of Embodiment 2 described above. Differences from light source device 2A according to Variation 2 of Embodiment 2 will thus be mainly described below in this variation.

As shown in FIG. 13, in light source device 2B according to this variation, optical element 20B has the same configuration as optical element 20A according to Variation 1 of Embodiment 1 (see FIG. 6A). Optical element 20B is disposed between semiconductor light-emitting device 10 and mirror 130.

Light source device 2B according to this variation, light 51 emitted from semiconductor light-emitting element 11 is converted into excitation light 54 by optical element 20, reflected by mirror 130, and then incident on phosphor element 30. Accordingly, a predetermined light intensity distribution is formed on the light-emitting surface of phosphor element 30.

In this manner, like in Variation 1 of Embodiment 2, light source device 2B according to this variation efficiently converts the light emitted from semiconductor light-emitting element 11 into excitation light 54 with a uniform intensity distribution. At the same time, a small-size light source device is achieved, which facilitates designing of the intensity distribution of excitation light 54.

This variation requires a shorter distance from semiconductor light-emitting device 10 to phosphor element 30, enabling further miniaturization of the light source device and reduction in the number of the members. Accordingly, an easily adjustable light source device is achieved.

Embodiment 3

Figure 14:
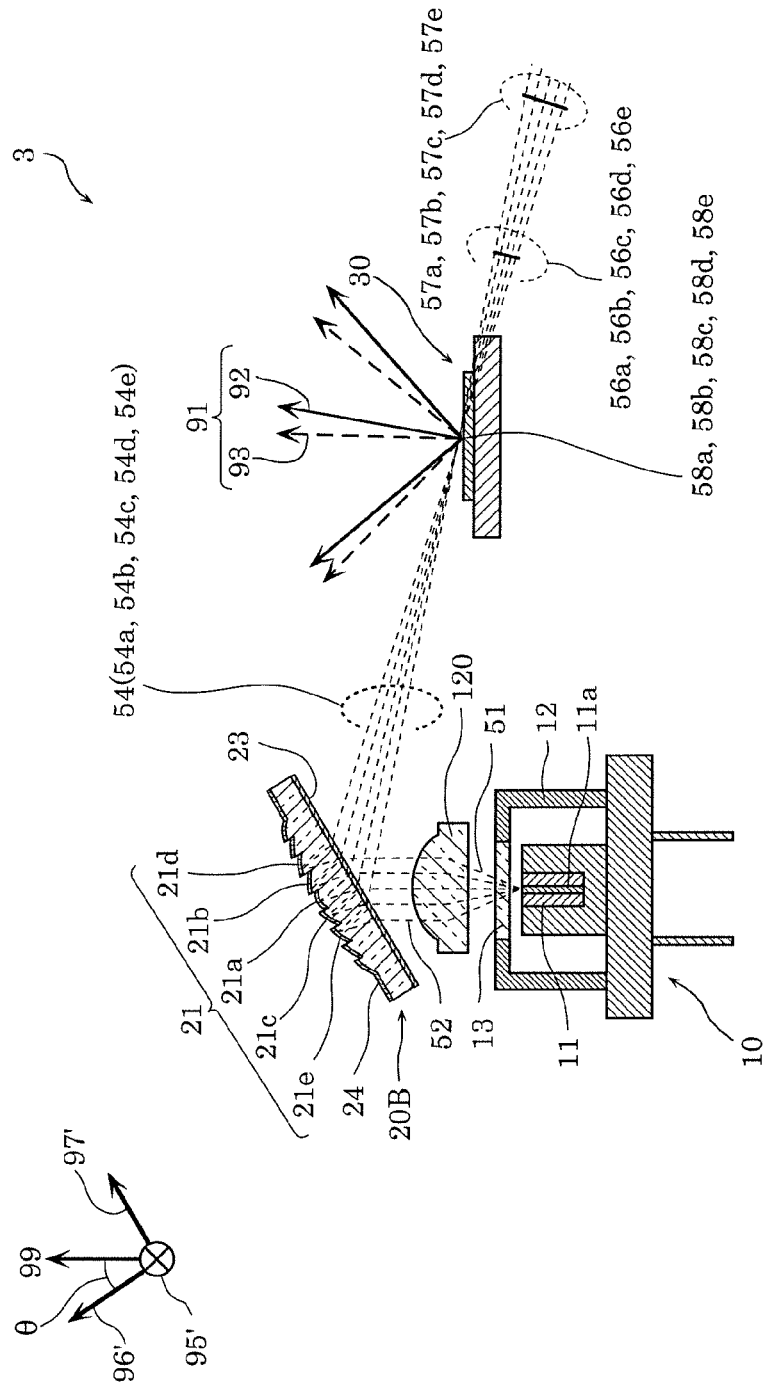
FIG. 14 illustrates a configuration of a light source device according to Embodiment 3 of the present disclosure.
Figure 15:
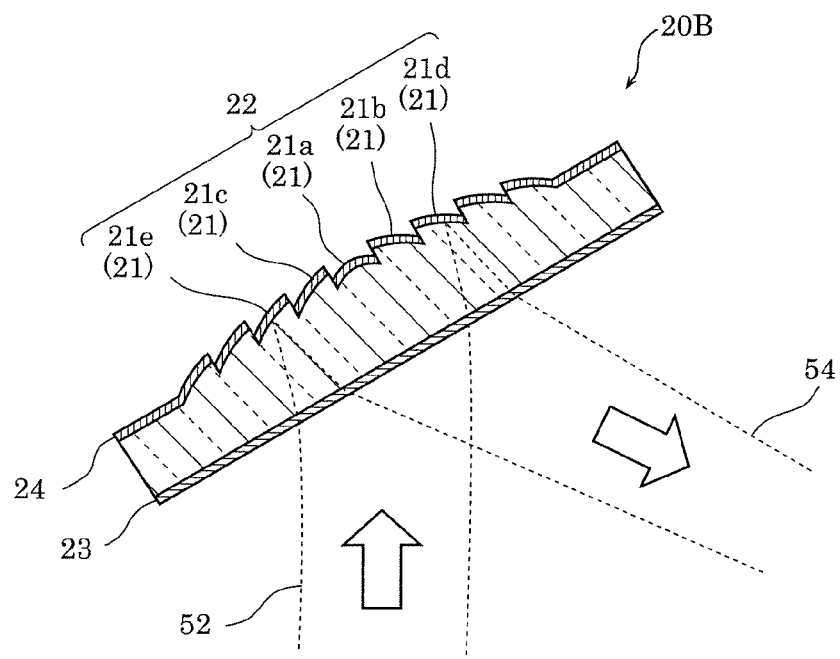
FIG. 15 illustrates an optical path of an optical element in the light source device according to Embodiment 3 of the present disclosure.
Figure 16:
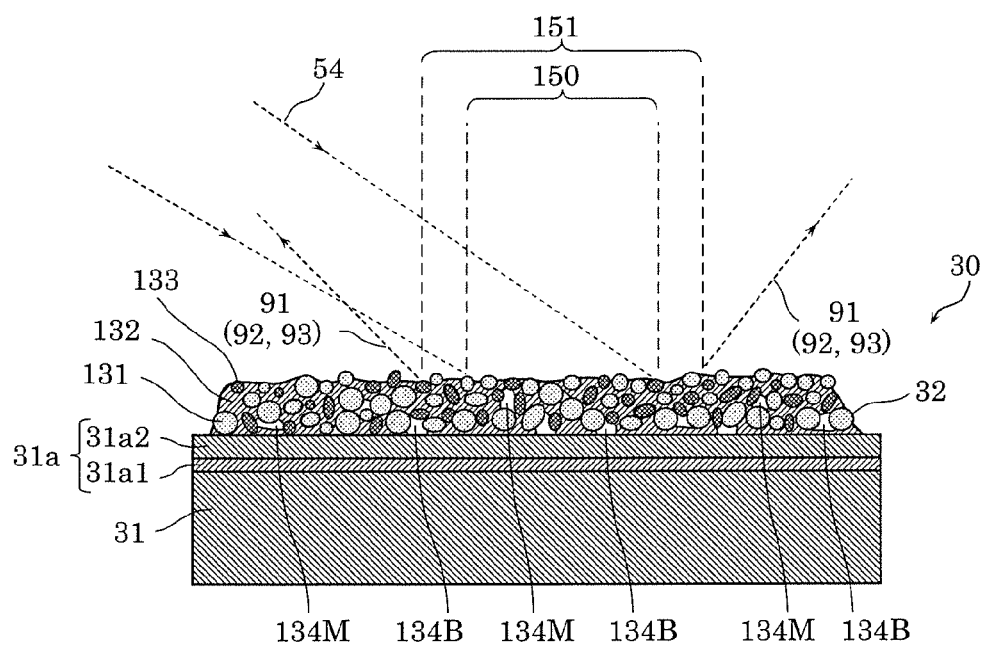
FIG. 16 illustrates a configuration of a phosphor element in the light source device according to Embodiment 3 of the present disclosure.

Next, a configuration of light source device 3 according to Embodiment 3 of the present disclosure will be described with reference to FIGS. 14 to 16. FIG. 14 illustrates the configuration of light source device 3 according to Embodiment 3 of the present disclosure. FIG. 15 illustrates a configuration of optical element 20B in this light source device 3. FIG. 16 illustrates a configuration of phosphor element 30 mounted in this light source device 3.

As shown in FIG. 14, in this embodiment, semiconductor light-emitting element 11 is disposed so that the stripe width of optical waveguide 11a is orthogonal to coordinate axis 95'. Semiconductor light-emitting element 11 emits light 51 along coordinate axis 99.

In this embodiment, optical element 20B has a different configuration from optical element 20 according to Embodiments 1 and 2. Specifically, while optical element 20 according to Embodiments 1 and 2 is of a transmission type, optical element 20B according to this embodiment is of a reflection type.

Like optical element 20 according to Embodiments 1 and 2, optical element 20B according to this embodiment includes a plurality of lens regions 21 with different focal points, and at least one of the lens regions is astigmatic. Such a plurality of lens regions 21 are formed on the reflecting surface of reflection optical element 20B according to this embodiment.

Optical element 20B is disposed so that the normal line of optical element 20B is inclined at angle θ with respect to optical axis (coordinate axis 99) of light 51 emitted from semiconductor light-emitting device 10 about coordinate axis 95' as a rotation axis.

Light 52 incident on optical element 20B is reflected and collected by the plurality of lens regions 21 (21a, 21b, 21c, 21d, and 21e), and converted into excitation light 54 (excitation beams 54a, 54b, 54c, 54d, and 54e) to irradiate phosphor element 30.

Each of the plurality of lens regions 21 of optical element 20B is astigmatic. Light 52 incident on the plurality of lens regions 21 is converted into excitation light 54 (excitation beams 54a, 54b, 54c, 54d, and 54e), respectively, which is collected to form circles 56a, 56b, 56c, 56d, and 56e of least confusion and focal lines due to the astigmatism applied to respective lens regions 21. First focal lines 57a, 57b, 57c, 57d, and 57e and second focal lines 58a, 58b, 58c, 58d, and 58e sandwich circles 56a, 56b, 56c, 56d, and 56e of least confusion behind and in front of the circles, respectively.

Excitation beams 54a, 54b, 54c, 54d, and 54e partially or entirely overlap each other on the light-emitting surface of phosphor element 30. In the plurality of lens regions 21, the light incident along coordinate axis 97' is most focused on the second focal lines. In this embodiment, the second focal lines are located almost on the light-emitting surface of phosphor element 30. The respective second focal lines of excitation light 54 (i.e., the excitation beams) overlap each other.

As light 52 incident on optical element 20B, light 51 emitted from semiconductor light-emitting element 11 incident at a greater angle of radiation along coordinate axis 95', and at a smaller angle of radiation along coordinate axis 97' (i.e., multi-mode light along stripe width W).

With this arrangement, the light has the minimum width in the direction, which is less likely to decrease due to the slope of phosphor element 30 and the influence of the multi-mode. The beam widths are almost equal to each other along the two orthogonal axes. Accordingly, a uniformized light intensity distribution is provided, which has almost equal vertical and horizontal beam widths.

Now, more advantageous embodiments of optical element 20B and phosphor element 30 used for light source device 3 according to this embodiment will be described below.

First, an advantageous embodiment of optical element 20B will be described in detail with reference to FIG. 15. Optical element 20B may be obtained by forming the plurality of lens regions 21 on one surface of a transparent substrate made of, for example, white glass, BK7, quartz, or sapphire.

As shown in FIG. 15, antireflective film 23 and reflective film 24 are formed to efficiently convert light 52 incident on optical element 20B into excitation light 54. Antireflective film 23 is formed on the surface of optical element 20B, on which light is incident, whereas reflective film 24 is formed on the plurality of lens regions 21 on the opposite surface.

Antireflective film 23 and reflective film 24 are made of, for example, a plurality of dielectric materials with different refractive indexes. For example, antireflective film 23 and reflective film 24 are formed by stacking a plurality of layers of materials such as $SiO_2$, $TiO_2$, $Ta_2O_5$, and $Nb_2O_5$ by sputtering or vapor deposition. Reflective film 24 may be made of highly reflective metal such as Ag, Cu, Au, or Al or an alloy of these metals.

Next, an advantageous embodiment of phosphor element 30 will be described in detail with reference to FIG. 16.

Phosphor element 30 includes support member 31, and phosphor layer 32 on support member 31.

Support member 31 is a substrate such as a silicon substrate or a ceramic substrate made of, for example, aluminum nitride. Optical film 31a, which reflects visible light, is formed on the surface of support member 31.

Optical film 31a may be a single or multilayer. In this embodiment, optical film 31a is a double layer of first optical film 31a1 and second optical film 31a2. First optical film 31a1 is a reflective film, which is a metal film made of, for example, Ag, a Ag alloy, or Al. Second optical film 31a2 is a protective film, which protects first optical film 31a1, for example, from being oxidized. Second optical film 31a2 is a single or multilayer made of a dielectric material such as $SiO_2$, ZnO, $ZrO_2$, $Nb_2O_5$, $Al_2O_3$, $TiO_2$, SiN, and/or AlN.

Phosphor layer 32 includes a plurality of phosphor particles 131 (i.e., first particles) and binder 132 that fixes the plurality of phosphor particles 131. Phosphor particles 131 may be $(Y_xGd_{1-x})_3(Al_yGa_{1-y})_5O_{12}$:Ce, where $0.5 \leq x \leq 1$ and $0.5 \leq y \leq 1$, with an average particle size, for example, within a range from 1 μm to 30 μm. Binder 132 may be made of a transparent material mainly containing, for example, silsesquioxane such as polymethylsilsesquioxane.

As a plurality of fillers 133 (i.e., second particles), fine particles of $Al_2O_3$ with an average particle size of 0.1 μm to 10 μm and a thermal conductivity of 30W/(m·K) may be mixed into phosphor layer 32. At this time, fillers 133 may be mixed into phosphor particles 131 at a ratio within a range from 10 vol % or to 90 vol %. In this embodiment, fillers 133 are made of $Al_2O_3$ with a refractive index of 1.8, which is largely different from the refractive index of silsesquioxane, namely 1.5. This configuration improves the light-scattering properties inside phosphor layer 32, and the thermal conductivity of phosphor layer 32.

Furthermore, voids 134M and 134B may be formed inside phosphor layer 32. In this embodiment, voids 134M are formed around the center of phosphor layer 32 in the thickness direction, whereas voids 134B are formed around the boundary between optical film 31a and phosphor layer 32.

Voids 134M and 134B are formed inside phosphor layer 32, with the density increasing toward optical film 31a. This configuration allows for more efficient scattering of the excitation light, which has entered the inside, and extraction of the light from light source device 3. Voids 134B are in contact with second optical film 31a2, which is a dielectric body. Thus, the formation of voids 134B allows for reduction in energy losses, and efficient scattering of excitation the light and fluorescence.

The arrangement of voids 134M and 134B described above is easily available, if a wavelength conversion member is made of a phosphor paste, which is a mixture of phosphor particles 131 of YAG:Ce and binder 132 made of polysilsesquioxane as described in Embodiment 1. Specifically, a film is formed on support member 31 using the phosphor paste obtained by mixing phosphor particles 131 and the second particles into binder 132. Binder 132 is obtained by dissolving polysilsesquioxane into an organic solvent. The film is then annealed at a high temperature of about 200° C. to vaporize the organic solvent in the paste. At this time, since the organic solvent vaporized from the part of the film near the support member of the wavelength conversion member is easily held, voids 134M and 134B are easily formed. Such a manufacturing method facilitates formation of voids 134M and 134B at a higher density near optical film 31a.

In this embodiment, phosphor element 30 with the configuration described above is disposed so that the direction of the normal line of the light-emitting surface of phosphor element 30 almost agrees with coordinate axis 99 of light source device 1C. As in Embodiment 2, phosphor element 30 may also be inclined in this embodiment. Arrangement of phosphor element 30 like in this embodiment allows for perpendicular radiation of radiation light 91 to the reference plane. It is more advantages in forming a light source device, if phosphor element 30 is disposed as in this embodiment.

The angle of light 52 incident on optical element 20B is adjustable by rotation angle θ of optical element 20B. To extract a larger amount of light 91 radiated from phosphor element 30, rotation angle θ may be smaller than 45 degrees, and particularly fall within a range from 30 degrees to 40 degrees.

Figure 17A:
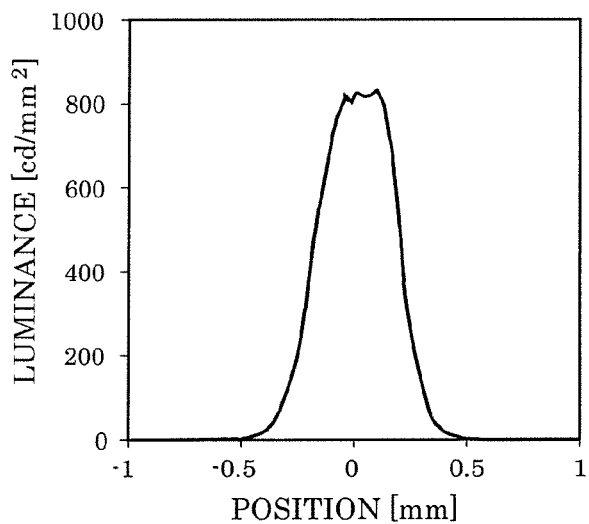
FIG. 17A illustrates a luminance distribution of the light radiated from the phosphor element at the phosphor element in the light source device according to Embodiment 3 of the present disclosure.
Figure 17B:
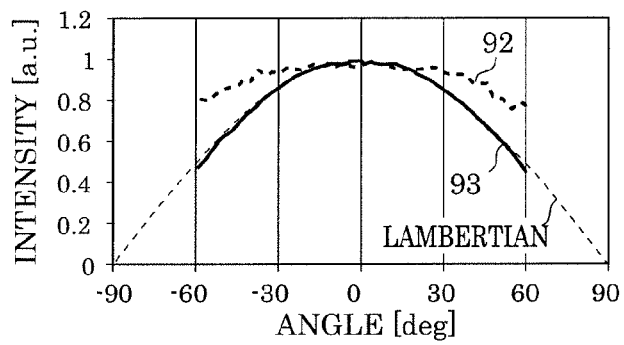
FIG. 17B illustrates the dependency of the intensities of the scattered light and fluorescence emitted from the phosphor element of the light source device according to Embodiment 3 of the present disclosure on an emission angle.
Figure 17C:
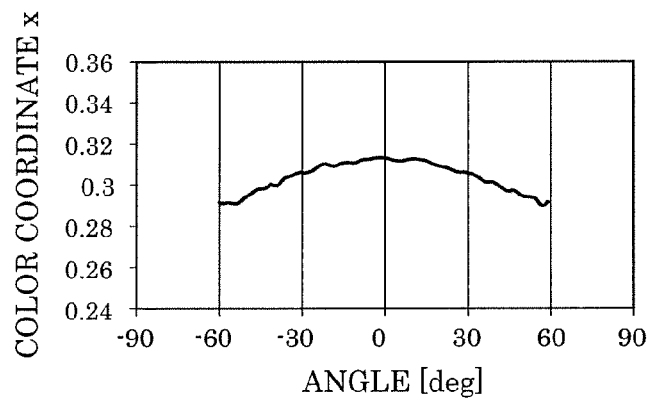
FIG. 17C illustrates the dependency of chromaticity x of radiation light composed of the scattered light and fluorescence emitted from the phosphor element of the light source device according to Embodiment 3 of the present disclosure on the emission angle.

Next, advantageous effects of light source device 3 according to this embodiment will be described with reference to FIGS. 17A to 17C. FIGS. 17A to 17C illustrate characteristic data of light 91 radiated from phosphor element (light emitter) 30 of light source device 3. Specifically, FIG. 17A illustrates a luminance distribution of light 91 radiated at phosphor element 30. FIG. 17B illustrates the dependency of the intensities of scattered light 92 and fluorescence 93 emitted from phosphor element 30 on the emission angle. At this time, the direction with an emission angle of 0 degrees represents direction of the normal line of the light-emitting surface of phosphor element 30. The light intensity is standardized at 0 degrees. FIG. 17C illustrates the dependency of chromaticity x of radiation light 91 composed of scattered light 92 and fluorescence 93 on the emission angle.

In measuring the characteristic data shown in FIGS. 17A to 17C, light source device 3 includes semiconductor light-emitting device 10, lens 120, optical element 20B, and a holder (no shown) that fixes phosphor element 30 to a predetermined position, in addition to the configuration shown in FIG. 14. This holder functions to hold lens 120, optical element 20B and phosphor element 30, and dissipate the heat generated at semiconductor light-emitting device 10 and phosphor element 30 outside.

As semiconductor light-emitting element 11, a laser element is used, which emits a blue laser beam with a peak wavelength of 445 nm and a light output of 3 W. Phosphor element 30 with a structure shown in FIG. 16 is used. Phosphor layer 32 of phosphor element 30 has a thickness of 30 μm. Phosphor particles 131 are YAG phosphor with an average particles size of 6 μm. Fillers 133 are alumina particles with an average particles size of 3 μm.

As shown in FIG. 16, excitation light 54 created by optical element 20B from the light emitted from semiconductor light-emitting element 11 is used to irradiate excitation region (excitation range) 150, which is an about 0.5 mm square region. Excitation light 54 is then scattered and absorbed on the surface or inside phosphor layer 32. A part of excitation light 54 becomes scattered light 92, which is a scattered blue laser beam to be radiated from phosphor layer 32. The other part of excitation light 54 becomes fluorescence 93, which is yellow light to be radiated from phosphor layer 32. At this time, excitation light 54, scattered light 92, and fluorescence 93 are scattered transversely inside phosphor layer 32, that is, while being propagated inside phosphor layer 32. Excitation light 54, scattered light 92, and fluorescence 93 are thus radiated from light-emitting region (light emission range) 151, which is wider than excitation region 150.

At this time, phosphor layer 32 is configured, as in this embodiment to cause large differences in refractive index between binder 132 and phosphor particles 131, and between binder 132 and fillers 133. This configuration facilitates scattering of light, and reduces propagation of light inside phosphor layer 32. As a result, light 91 is radiated from light-emitting region 151 that is slightly wider than excitation region 150. In this embodiment, voids 134B and 134M formed in phosphor layer 32 promote the scattering of light. As a result, the size of excitation region 150 becomes closer to the size light-emitting region 151.

As shown in FIG. 17A, with respect to the luminance distribution at phosphor element 30, the light-emitting region with a luminance of 200 cd/mm$^2$ or higher has a width of about 0.5 mm. A light-emitting region is achieved, which has almost the same luminance as the excitation light. The luminance around the peak is 800 cd/mm$^2$ or higher, and a region with a flat and uniform top is achieved.

FIG. 17B illustrates the dependency of scattered light 92 and fluorescence 93 in the direction (the direction indicated by coordinate axis 95' in FIG. 14) orthogonal to the direction, in which excitation light 54 is incident, on the emission angle. It is found from FIG. 17B that scattered light 92 is sufficiently scattered and radiated using phosphor element 30 according to this embodiment. In particular, since light is sufficiently scattered inside phosphor element 30, a distribution is achieved, which has a higher light intensity than a Lambertian distribution represented by cos 0, in a region with a greater angle. Such a distribution allows for setting of the angle distribution of the chromaticity of radiation light 91 composed of scattered light 92 and fluorescence 93 so that chromaticity x decreases with an increase in the emission angle. That is, a distribution with a greater angle of radiation and a higher correlated color temperature is achieved. With the use of a light source providing such a distribution, a projector is achieved, which projects light with the following color temperature. While the color temperature at an angle of 0 degrees, that is, the irradiation center is a chromaticity with a high luminous efficiency, the correlated color temperature of a total luminous flux is high.

As described above, in light source device 3 according to this embodiment, the respective excitation beams emitted from the plurality of lens regions 21 have different focal points, and are astigmatic and designed to overlap each other on the light-emitting surface of phosphor element 30. This uniformizes the intensity distribution of excitation light 54 emitted from optical element 20B as a whole.

Therefore, light source device 3 according to this embodiment efficiently converts the light emitted from semiconductor light-emitting element 11 into excitation light 54 with a uniform intensity distribution.

In light source device 3 according to this embodiment, light is largely scattered inside phosphor layer 32 of phosphor element 30. A light source device is thus achieved, which has a light intensity distribution corresponding to the intensity distribution of excitation light 54 converted by optical element 20B. Accordingly, a light source device is achieved, which radiates light with a uniform light intensity distribution from phosphor element 30.

In this embodiment, the light emitted from semiconductor light-emitting element 11 is reflected by optical element 20B to create excitation light 54. This further reduces the distance between semiconductor light-emitting device 10 and phosphor element 30. Accordingly, further miniaturization of the light source device is possible.

In this embodiment, while binder 132 of phosphor layer 32 of phosphor element 30 is made of polymethylsilsesquioxane, the material is not limited thereto. For example, binder 132 may be mainly made of an inorganic substance such $SiO_2$, $Al_2O_3$, ZnO, $Ta_2O_5$, $Nb_2O_5$, $TiO_2$, AlN, BN, or BaO. Such a material leads to achievement of highly reliable phosphor element 30. The material of fillers (i.e., second particles) 133 contained in phosphor layer 32 is not limited to $Al_2O_3$. Alternatively, fine particles made of, for example, $SiO_2$ or $TiO_2$ may be selected. In particular, fine particles of boron nitride or diamond with a high thermal conductivity may be used as fillers 133 to improve the light-scattering properties of phosphor layer 32. In addition, the heat generated at phosphor particles 131 is efficiently transmitted to support member 31.

Variation 1 of Embodiment 3

Figure 18:
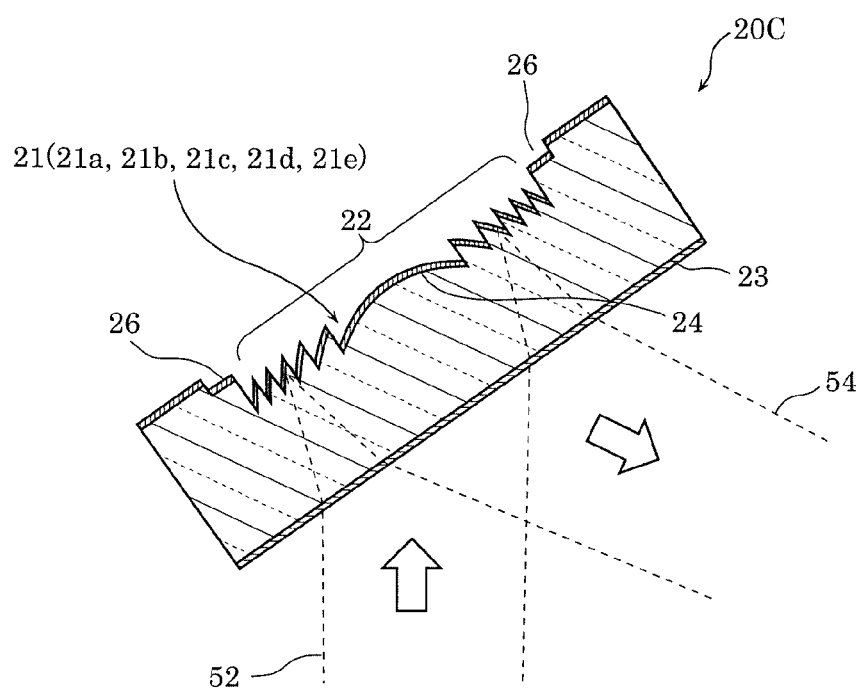
FIG. 18 illustrates a configuration of a light source device according to Variation 1 of Embodiment 3 of the present disclosure.
Figure 19:
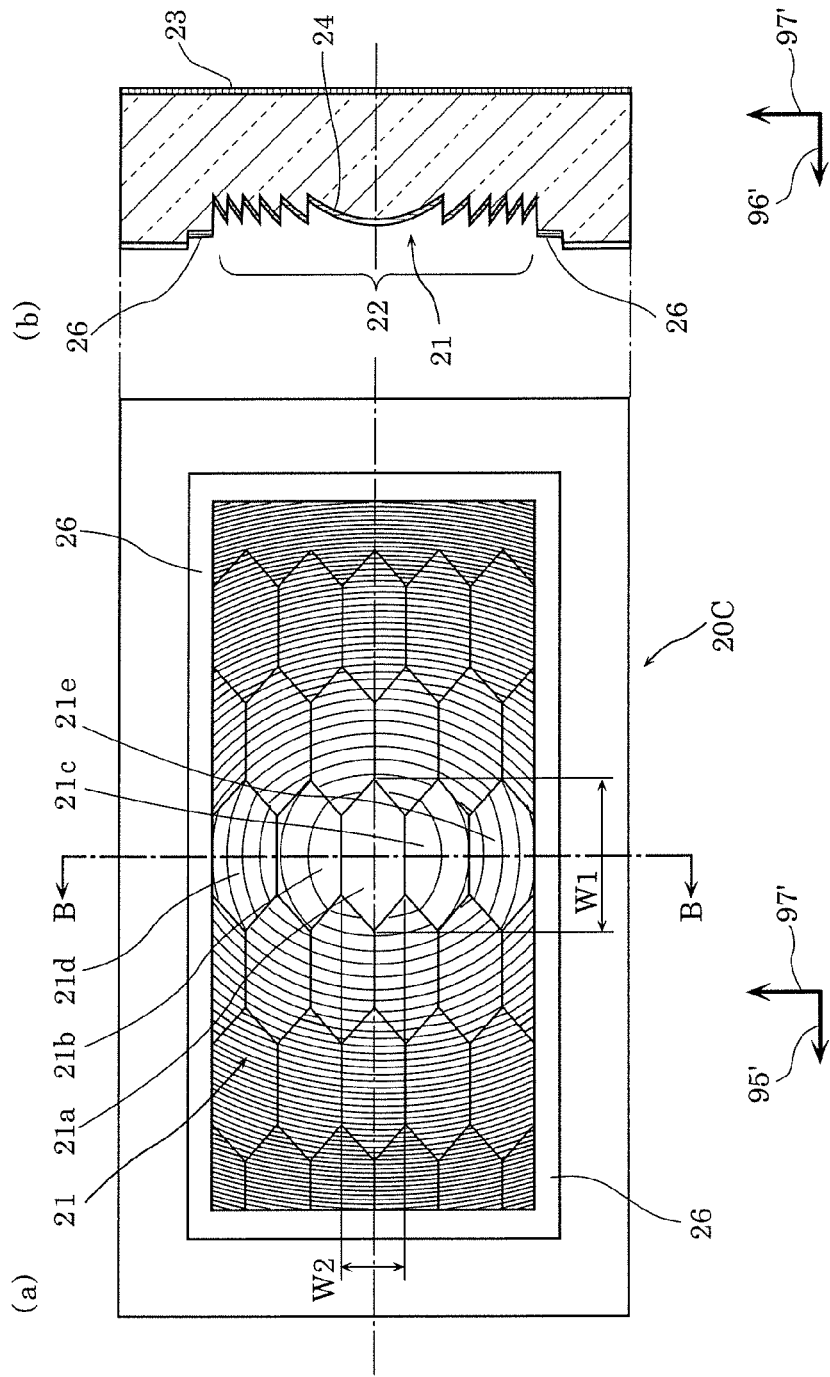
FIG. 19 illustrates a configuration of an optical element in the light source device according to Variation 1 of Embodiment 3 of the present disclosure.

Then, a light source device according to Variation 1 of Embodiment 3 of the present disclosure will be described with reference to FIGS. 18 and 19. FIG. 18 illustrates a configuration and arrangement of optical element 20C according to the light source device according to Variation 1 of Embodiment 3 of the present disclosure. FIG. 19 illustrates the configuration of optical element 20C. Section (a) is a plan view of optical element 20C including orthogonal coordinate axes 95' and 97' as viewed from the surface provided with the plurality of lens regions 21. Section (b) is a cross-sectional view taken along line B-B of (a).

In the light source device according to this variation, optical element 20B in light source device 3 according to Embodiment 3 shown in FIGS. 14 and 15 is replaced with optical element 20C, which is disposed as shown in FIG. 18.

As shown in FIGS. 18 and 19, in optical element 20C according to this variation, optical functional part 22 is a fresnelized lens mirror. This significantly reduces the size of step 26 at the boundary between the area divided into the plurality of lens regions 21 and the non-divided area, as compared to the step at the boundary between the divided and non-divided areas in optical element 20B according to Embodiment 3 (see FIG. 15). That is, optical element 20C has a small step, which is typical for a fresnelized lens mirror.

If optical element 20C is inclined as in this variation, light 51 emitted from the semiconductor light-emitting device is, as incident light 52, obliquely incident on the plurality of lens regions 21 of optical element 20C. The light is then obliquely reflected and converted into excitation light 54. At this time, if there is a large step at the boundary between the area divided into the plurality of lens regions 21 and the non-divided area, the step serves as a barrier to generate light, which fails to be converted into excitation light. The Fresnelization as in this variation lowers the position of the step to be a height typical for a fresnelized lens (mirror), and thus allows for efficient conversion of incident light 52 into excitation light 54.

In Fresnelization of optical functional part 22 as in this variation, the difference in optical path lengths is designed to be an integral multiple of the wavelength. The height of the step may thus be selected from integral multiples of the wavelength. For example, the height of the step may be 10 µm or lower, and particularly, 3 µm or lower.

In this manner, the use of optical element 20C including fresnelized optical functional part 22 allows for efficient conversion of incident light 52 into excitation light 54, even if optical element 20C is inclined.

A more specific configuration and a manufacturing method of optical element 20C will be described with reference to FIG. 19.

As shown in (a) of FIG. 19, optical element 20C has, as a whole, a rectangular shape in a plan view. Specifically, optical element 20C has a rectangular shape with longer sides along coordinate axis 95' and shorter sides along coordinate axis 97'. The rectangular planar shape of optical element 20C increases the number of optical elements 20C obtained from a wafer at the time of fabrication. That is, this shape leads to a high mass productivity.

Each of the plurality of lens regions 21 has a rectangular outer shape with longer sides along coordinate axis 95' and shorter sides along coordinate axis 97'. This relates to the direction in which semiconductor light-emitting element 11 of semiconductor light-emitting device 10 according to Embodiment 3 shown in FIG. 14 is arranged. The outer shape depends on the radiation angle characteristics of light 52 incident from semiconductor light-emitting element 11. Specifically, the angle of radiation of light 52 incident from semiconductor light-emitting element 11 is greater along coordinate axis 95' and smaller among coordinate axis 97'. The rectangular outer shape of each lens region 21 provides the advantage of reducing the size of optical element 20C, while efficiently converting incident light 52 into excitation light 54.

In this variation, the outer size of optical element 20C may have a ratio (transverse width)/(longitudinal width) of 0.7 or lower. This configuration provides a sufficient angle of light 91 radiated from phosphor element 30, while reducing the distance between semiconductor light-emitting device 10 and phosphor element 30. Accordingly, a smaller-size light source device is achieved.

The outer shape of each lens region 21 is not limited to the rectangle, and may be any shape as long as light 52 incident from semiconductor light-emitting element 11 is efficiently extracted in accordance with the radiation angle characteristics of incident light 52. For example, each lens region 21 may have a long oval outer shape with short and long axes.

Next, the detail of the plurality of lens regions 21 will be described. The plurality of lens regions 21 form a Fresnel lens mirror. Each of the plurality of lens regions 21 has a hexagonal shape with widths W1 and W2, where W1 represents the width along coordinate axis 95' and W2 represents the width along coordinate axis 96'. In this variation, W1>W2.

In view of uniformizing the intensity distribution of the light on the light-emitting surface of phosphor element 30, the following design is advantages. Light 52 incident on optical element 20C is divided into a larger number of beams to be converted into the excitation beams (i.e., excitation light 54), and a larger number of the excitation beams (i.e., excitation light 54) overlap each other on the light-emitting surface of phosphor element 30. If the number of the boundaries between adjacent divisions increases with an increase in the number of the divisions, more parts may fail to be converted into excitation light 54 to reduce the efficiency. On the other hand, in view of designing the beam widths in the intensity distribution of excitation light 54 on the light-emitting surface of phosphor element 30, width W1 that is a first divisional width needs to be greater than a desired beam width in the intensity distribution of excitation light 54. There is a limiting condition that the angle of radiation of incident light 52 (or emitted light 51) is smaller along width W2 (i.e., coordinate axis 97'), which a second divisional width. It is thus advantageous to satisfy W1>W2. The advantageous ratio of the divisional widths (W2/W1) may fall within a range from 0.3 to 0.6, particularly, from 0.4 to 0.5.

Such a divisional width ratio allows for efficient conversion of incident light 52 into excitation light 54. The ratio also provides a sufficient number of the excitation beams (i.e., excitation light 54), which overlap each other on the light-emitting surface of phosphor element 30, to provide a uniformized intensity distribution. The ratio facilitates the designing of the beam widths in the intensity distribution of excitation light 54 on the light-emitting surface of phosphor element 30.

Being hexagonal in this variation, the shape (i.e., the divisional shape) of each lens region 21 is not limited thereto and may be a quadrangle. Each quadrangular lens region 21 may satisfy the requirement of the divisional widths described above.

Next, a manufacturing method of optical element 20C will be described.

Optical element 20C is mainly manufactured by the following steps (1) to (9):

step (1) of preparing a wafer substrate made of a predetermined glass material;

step (2) of preparing a gray tone mask containing information on the plurality of lens regions;

step (3) of performing heat treatment, with a resist of a photosensitive material applied onto the wafer substrate at a predetermined thickness;

step (4) of exposing the resist to the information contained in the gray tone mask;

step (5) of developing the exposed resist using a developer;

step (6) of transferring a resist pattern onto the wafer substrate by etching;

step (7) of forming antireflective film 23 on one surface of the wafer substrate;

step (8) of forming reflective film 24 on the other surface of the wafer substrate; and step (9) of cutting the wafer substrate into optical elements 20C in a predetermined size.

In step (1) described above, the glass material of the wafer substrate is selected in view of the optical and etching properties. Specifically, it is advantages if there is no large difference in the amount of etching per time between the glass and the resist. The ratio of the amount of etching of the glass material per time to that of the resist may be 0.7 or higher. The size of the wafer substrate influences the number of optical elements 20C to be manufactured from a single wafer substrate. The size may thus be as large as possible, particularly have cp 3 inch or larger.

The gray tone mask in step (2) described above has a transmittance variable in multiple stages so that the plurality of lens regions 21 as a whole has a designed shape after the following steps. The gray tone mask is irradiated with light to expose the resist to the light transmitted through the gray tone mask in step (4) described above. A residue pattern is obtained from the resist after being developed in step (5) described above. A further residue pattern is obtained from the resist after being etched in step (6) described above. The resultant pattern of the resist is transferred onto the wafer substrate. That is, in a lower point of the plurality of lens regions 21, that is, in the point in which a larger amount of resist is etched, a smaller amount of resist remains and the gray tone mask thus has a higher transmittance. Conversely, in a higher point, in the point in which a smaller amount of resist is etched, a larger amount of resist remains and the gray tone mask thus has a lower transmittance.

In the embodiment above, a positive resist is used. If a negative resist is used, a reverse tendency is found, that is, the gray tone mask has a lower transmittance in a point in which a larger amount of resist is etched.

The gray tone mask has a transmittance so that the in-plane size of the gray tone mask is larger than, specifically, five or ten times as large as, the actual size of the plurality of lens regions 21 as a whole size. This is because, a stepper including an optical reduction system with a reduction factor of ⅕ or ¹⁄₁₀ is used in step (4) described above. For example, a g- or i-line stepper is used in accordance with the wavelength of the light source. Such an optical reduction system transfers information on the transmittance at a higher accuracy, resulting in accurate formation of the plurality of lens regions.

The wafer substrate applied with the resist is exposed, while moving so that the optical elements are arranged in predetermined positions. This allows for arrangement of a large number of optical elements in the wafer substrate, that is, formation of the large number of optical elements at the same time in steps (5) to (8) described above.

The gray tone mask may be prepared only once in manufacturing optical element 20C, and used continuously.

When the exposed resist is developed in step (5) described above, it is important to provide the exposed region with a new developer and to smoothly discharge the old developer including the resist, to uniformly develop the exposed region. In (b) of FIG. 19, step 26 shallower than the plurality of lens regions 21 is formed on the periphery of optical element 20C in contact with the plurality of lens regions 21. Even if the resist is exposed, this step 26 is present, through which the developer smoothly flows in the developing step. This allows for uniform development throughout the entire resist region serving as the plurality of lens regions 21, and thus accurate formation of the resist pattern, which becomes the plurality of lens regions 21. The width of step 26 may fall within a range from 0.05 mm to 0.2 mm, but is not limited thereto. Alternatively, step 26 may be inclined or formed in multiple stages.

In step (6) described above, the developed resist pattern is transferred onto the glass substrate by dry etching. The surface roughness of the plurality of lens regions 21 after dry etching is important in view of efficiently converting incident light 52 (or emitted light 51) into excitation light 54. The surface roughness may be represented by root mean square roughness (Rq), where Rq<20 nm (rms) and particularly, Rq<10 nm (rms). The surface roughness after dry etching may increase depending on the additives or impurities contained in the glass material. The glass material may thus be quartz or sapphire glass containing less additives or impurities.

Steps (7) and (8) described above are steps for forming an optical film, which efficiently converts light 52 incident on optical element 20C into excitation light 54. The optical film is formed by alternately or sequentially stacking a plurality of dielectric materials (e.g., materials such as $SiO_2$, $TiO_2$, $Al_2O_3$, $Ta_2O_5$, and $Nb_2O_5$) with different refractive indexes one on the top of the other or another using a sputtering or vapor deposition system. In these steps, antireflective film 23 and reflective film 24 are formed. Reflective film 24 may be made of a high reflective metal material (e.g., a material such as Au, Ag, Cu, or Al or a Ag alloy material).

The order of steps (7) and (8) may be reverse. A system forming the two films at same time may be advantageous.

Step (9) described above is a step of cutting the wafer substrate into optical elements 20C, each having the plurality of lens regions 21, in a predetermined size. Optical elements 20C are obtained by cutting with a dicer.

Each of optical elements 20C manufactured by the steps described above has a high mass productivity and an accurate shape, and thus allows for efficient conversion of incident light 52 into excitation light 54. As a result, a small-size light source device is achieved.

This variation is an application example of Embodiment 3, but not limited thereto. This variation is also applicable to optical elements 20, 20A, and 20B according to Embodiments 1 and 2. In this case, step (8) described above may be a step of forming an antireflective film on the other surface.

Variation 2 of Embodiment 3

Figure 20:
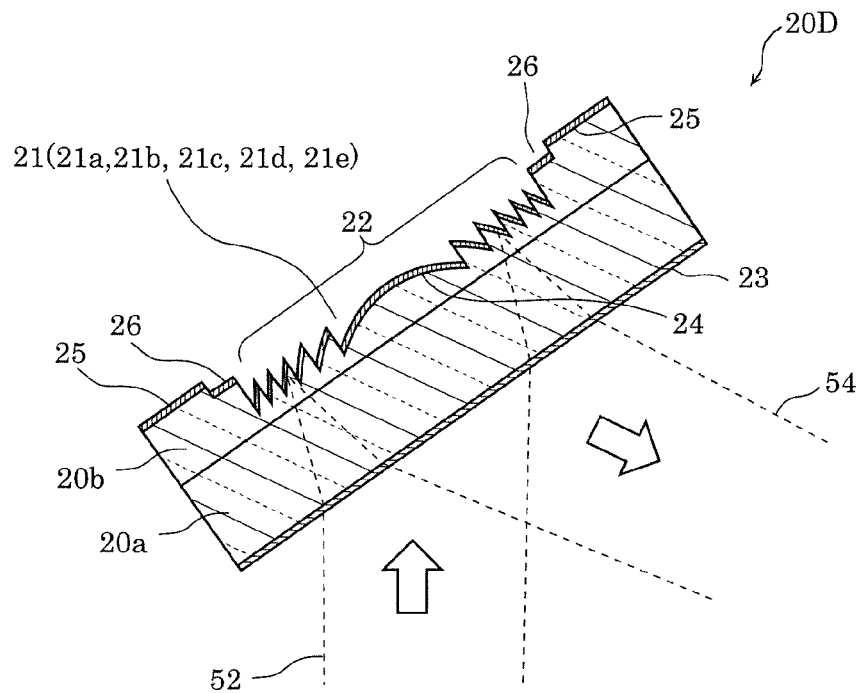
FIG. 20 illustrates a configuration of an optical element in a light source device according to Variation 2 of Embodiment 3 of the present disclosure.

Then, a light source device according to Variation 2 of Embodiment 3 of the present disclosure will be described with reference to FIG. 20. FIG. 20 illustrates a configuration of optical element 20D in the light source device according to Variation 2 of Embodiment 3 of the present disclosure. Optical element 20D used for the light source device according to this variation has almost the same configuration as optical element 20C used in Variation 1 of Embodiment 3. Differences from optical element 20C according to Variation 1 of Embodiment 3 will thus be mainly described below in this variation.

As shown in FIG. 20, optical element 20D according to this variation includes glass substrate 20a, and dielectric film 20b on glass substrate 20a. In this variation, the plurality of lens regions 21 of optical element 20D are formed in dielectric film 20b.

Step 26 is formed around the plurality of lens regions 21. Absorption film 25 is patterned on the surfaces of at least step 26 and dielectric film 20b around the plurality of lens regions 21.

Optical element 20C according to Variation 1 of Embodiment 3 shown in FIG. 19 may be a glass material with less additives or impurities to reduce the surface roughness after etching. However, glass materials with less additives or impurities are more expensive than general glass materials such as white glass or BK7.

To address the problem, a configuration like optical element 20D according to this variation provides a surface roughness as low as that of a glass substrate containing no additives or impurities. This is because dielectric film 20b contains no impurities. In addition, glass substrate 20a may be a cheaper glass substrate made of a general glass material such as white glass or BK7. While a most suitable material of dielectric film 20b is $SiO_2$, any other dielectric material may be used.

Optical element 20D according to this variation may be manufactured by performing vapor deposition of a dielectric film on a wafer substrate in step (1) in the manufacturing method of optical element 20C described above in Variation 1 of Embodiment 3. The step is followed by steps, which are the same as steps (2) to (9) for forming optical element 20C according to Variation 1 of Embodiment 3 described above.

A reduction in the size of optical elements 20D increases the number of optical elements 20D obtained from the wafer substrate, thereby effectively reducing manufacture costs. A decrease in the size of optical elements 20D provides a sufficient angle of radiation of light 91 from phosphor element 30, and causes semiconductor light-emitting device 10 to be closer to phosphor element 30. This effectively miniaturizes the light source device. However, there is a fear in reducing the overall size of the plurality of lens regions 21 with a decrease in the size of optical element 20D. Peripheral light around light 52 emitted from semiconductor light-emitting element 11 and incident on optical element 20D (particularly, light 52 incident at a greater angle of radiation along the length of optical element 20D) is incident outside the plurality of lens regions 21 to be emitted through an optical path different from the original optical path of the excitation light. To address the problem, absorption film 25 is formed in a predetermined pattern on the surfaces of at least step 26 and dielectric film 20b around the plurality of lens regions 21 as in this variation. Absorption film 25 absorbs the peripheral light around light 52 emitted from semiconductor light-emitting element 11 and incident on optical element 20D. Being absorbed by absorption film 25, light 52 incident out of the plurality of lens regions 21 is not emitted from optical element 20D. Even if being converted into excitation light 54, the peripheral light around incident light 52, which hardly contributes to the efficiency, can be blocked inside optical element 20D. This leads to sufficiently efficient conversion into excitation light 54, while reducing the size of optical element 20D. Absorption film 25 may overlap a part of the plurality of lens regions 21.

Absorption film 25 may be a multilayer of films such as $SiO_2$, Si, and Ti formed with a sputtering system. In this case, absorption film 25 may be patterned by: forming a resist pattern in a region requiring no absorption film 25; forming absorption film 25 on the resist pattern; and then removing the resist region. Alternatively, a metal mask with an opening is used to form absorption film 25 at the opening in a region requiring absorption film 25. The step of forming absorption film 25 may be followed by, for example, step (8) in the manufacturing method described in Variation 1 of Embodiment 3.

Absorption film 25 is applicable not only to this variation, but also to Variation 1 of Embodiment 3. This variation is an application example of Embodiment 3, but not limited thereto. This variation is also applicable to optical elements 20, 20A, and 20B according to Embodiments 1 and 2. In this case, step (8) described above is a step of forming an antireflective film on the other surface.

Figure 21A:
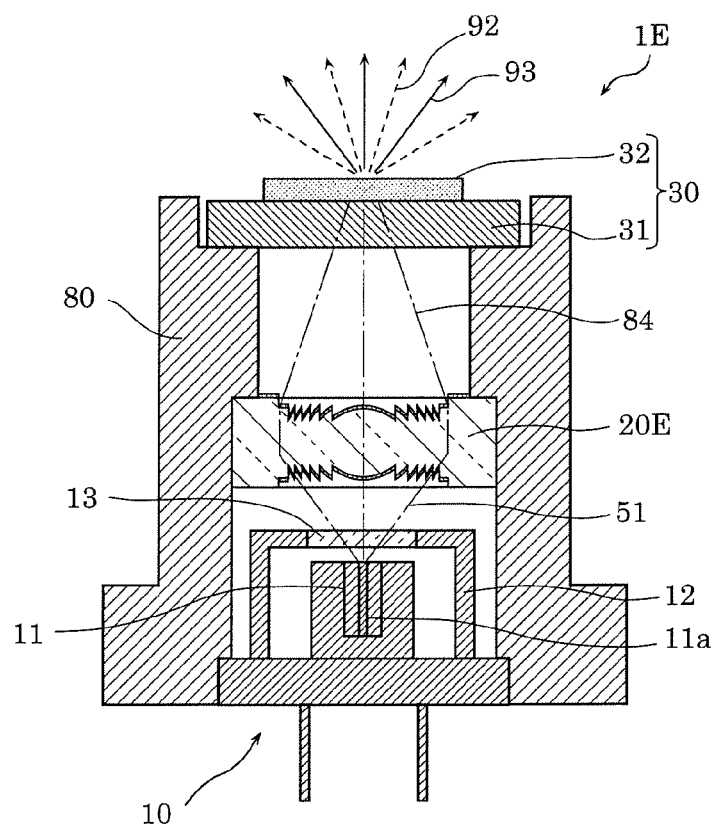
FIG. 21A illustrates a configuration of a light source device according to Variation 3 of Embodiment 3 of the present disclosure.
Figure 21B:
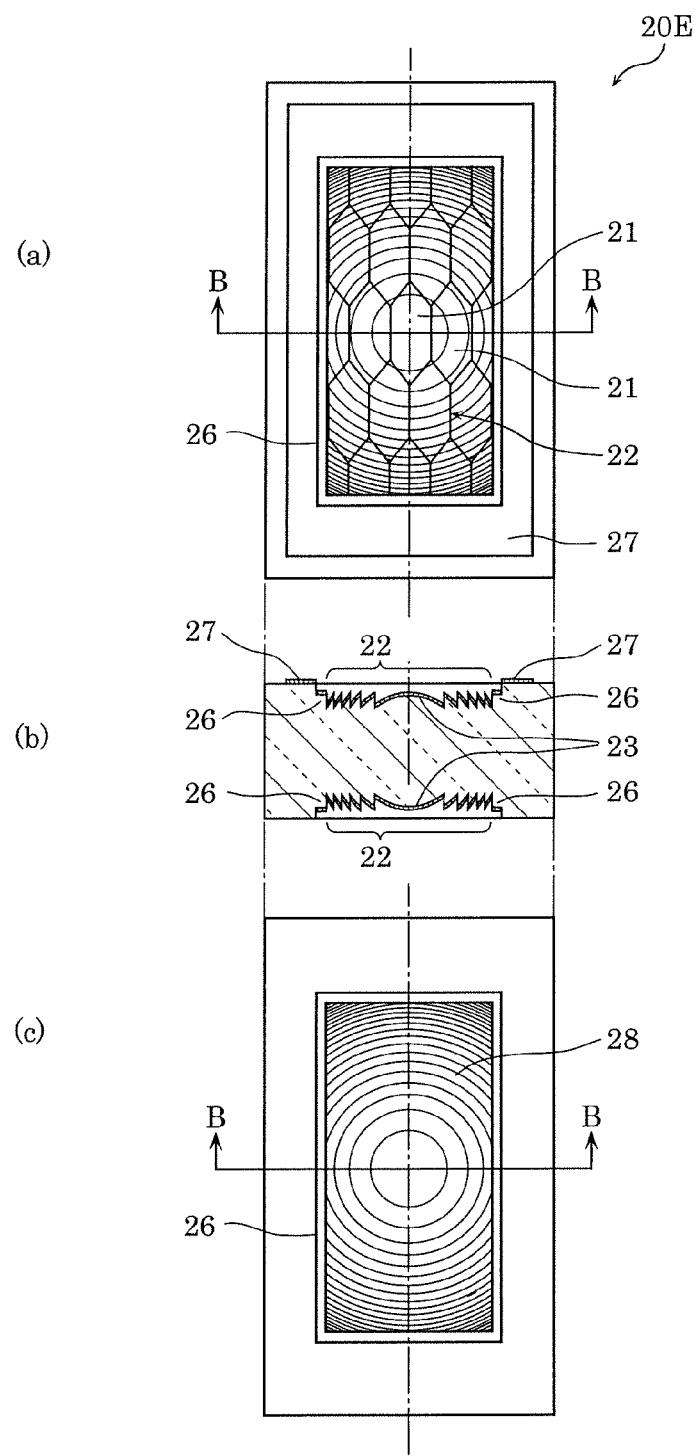
FIG. 21B illustrates a configuration of an optical element in the light source device according to Variation 3 of Embodiment 3 of the present disclosure.

Then, light source device 1E according to Variation 3 of Embodiment 3 of the present disclosure will be described with reference to FIGS. 21A and 21B. FIG. 21A illustrates a configuration of light source device 1E according to Variation 3 of Embodiment 1 of the present disclosure. FIG. 21B illustrates a configuration of optical element 20E in this light source device 1E. Section (a) is a plan view of optical element 20E as seen from the light-emitting side (i.e., the side facing phosphor element 30). Section (b) is a cross-sectional view taken along line B-B of Sections (a) and (c). Section (c) is a plan view of optical element 20E as seen from the light-incident side (i.e., the side facing semiconductor light-emitting element 11).

In light source device 1E according to this variation, optical element 20A according to Variation 1 of Embodiment 1 (see FIGS. 6A and 6B) is replaced with optical element 20E. The other configuration is the same as in Variation 1 of Embodiment 1. A configuration of optical element 20E will be mainly described below.

Optical element 20E shown in FIGS. 21A and 21B is obtained based on optical element 20A shown in FIGS. 6A and 6B. The plurality of lens regions 21 formed on the surface of optical element 20A, which serves as optical functional part 22, are fresnelized to serve as a Fresnel lens. The convex lens, which is formed in a sphere or asphere shape on the surface not provided with optical functional part 22, also serves as a Fresnel lens. That is, the Fresnel lenses are formed on both the light-incident and light-emitting surfaces of optical element 20E. The Fresnel lenses of optical element 20E may be formed in the same or similar manner as described in Variations 1 and 2 of Embodiment 3.

As shown in FIG. 21B, steps 26 are also formed on the periphery of element 20E in contact with the plurality of lens regions 21 on the light-emitting surface and the convex lens on the light-incident surface.

Antireflective films 23 are formed on the surfaces of the plurality of lens regions 21 and the convex lens. That is, antireflective films 23 are formed on both the light-emitting and light-incident surfaces of optical element 20E.

As shown in (a) of FIG. 21B, opening-limiting film 27 is formed on the surface (i.e., the light-emitting surface) of optical element 20E, which is provided with optical functional part 22. Opening-limiting film 27 has the same function as absorption film 25 in Variation 2 of Embodiment 3. Opening-limiting film 27 may be a light absorption film or a light reflective film made of, for example, metal such as Ti or Cr.

Optical element 20E with such a configured has an accurate shape, and thus allows for efficient conversion of incident light 52 into excitation light 54. Optical element 20E also has a high mass productivity and a smaller size, resulting in achievement of a smaller-size light source device 1E.

In light source device 1E according to this variation, optical element 20E is disposed so that the convex lens is located on the light-incident surface (i.e., the surface facing semiconductor light-emitting element 11). The arrangement is not limited thereto. Specifically, optical element 20E may be disposed so that the convex lens is located on the light-emitting surface (i.e., the surface facing phosphor element 30). In this variation, opening-limiting film 27 is formed on the light-emitting surface, but not limited thereto. Opening-limiting film 27 may be on the light-incident surface or on both the light-emitting and light-incident surfaces. Optical element 20E according to this variation may be replaced with light source device 1B according to Variation 2 of Embodiment 1 (see FIG. 7) or optical element 20A according to Variation 2 of Embodiment 2 (see FIG. 13).

Embodiment 4

Next, light source device 4 according to Embodiment 4 of the present disclosure will be described with reference to FIGS. 22A, 22B, 23 and 24.

Figure 22A:
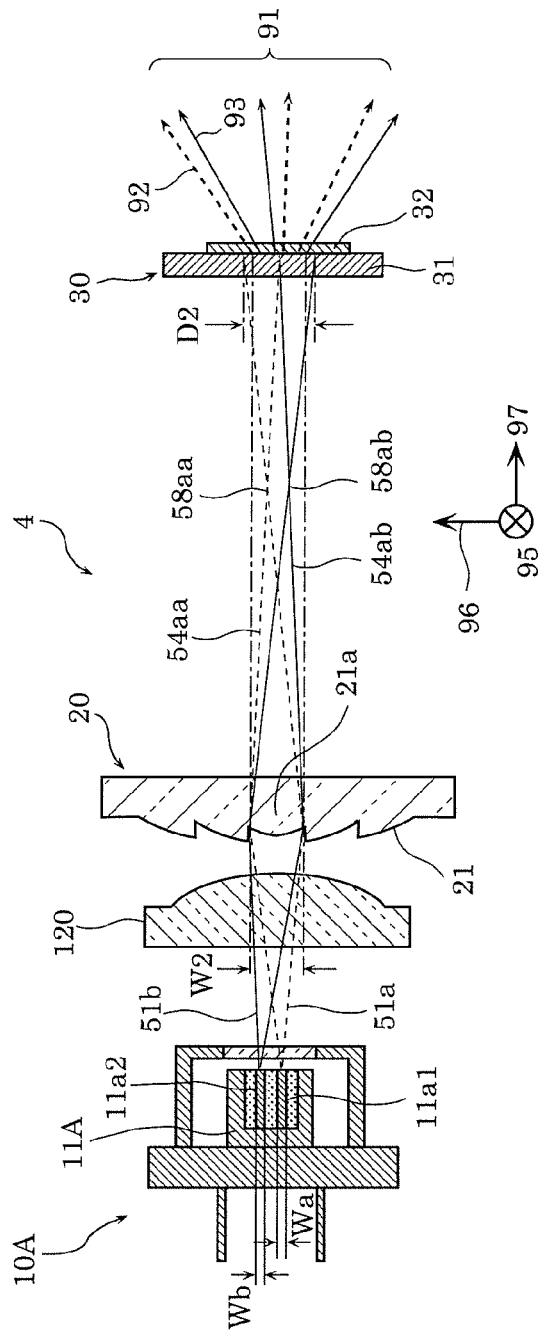
FIG. 22A illustrates a configuration of a light source device according to Embodiment 4 of the present disclosure.
Figure 22B:
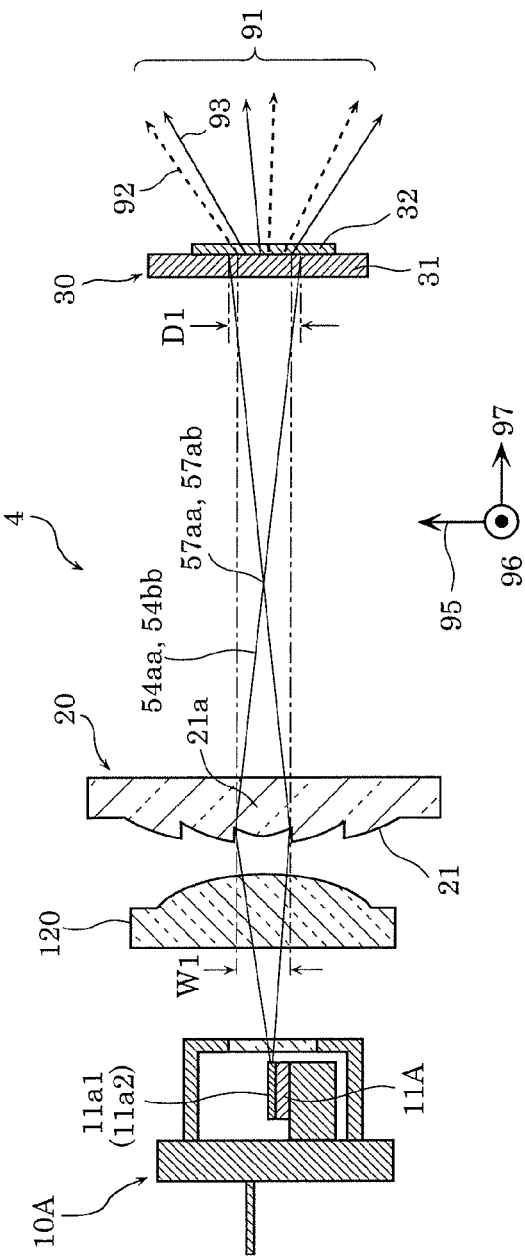
FIG. 22B illustrates the configuration of the light source device according to Embodiment 4 of the present disclosure.
Figure 23:
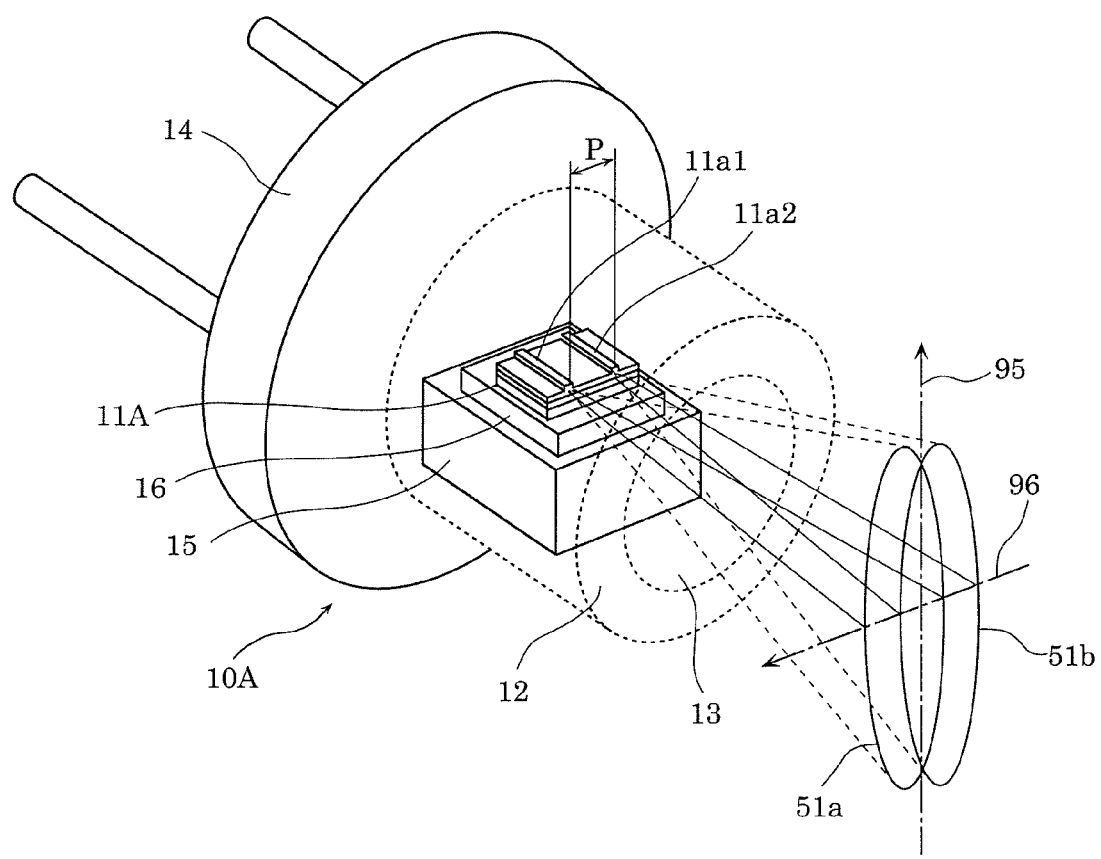
FIG. 23 illustrates a configuration of a semiconductor light-emitting device in the light source device according to Embodiment 4 of the present disclosure.
Figure 24:
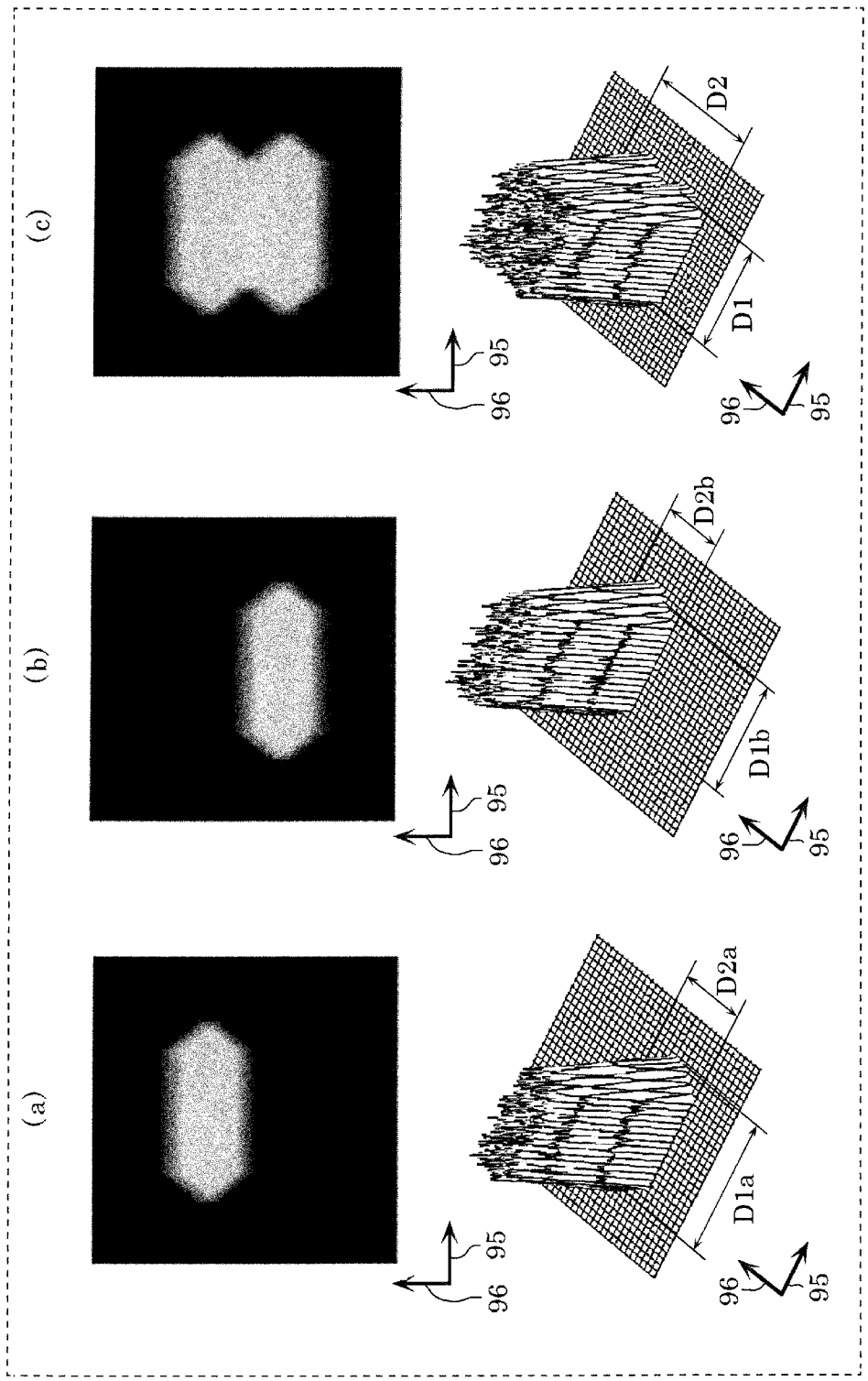
FIG. 24 illustrates a design example of an intensity distribution of excitation light on a light-emitting surface of a phosphor element in the light source device according to Embodiment 4 of the present disclosure.

FIGS. 22A and 22B illustrate a configuration of light source device 4 according to Embodiment 4 of the present disclosure. FIG. 22A is a plan view including coordinate axis 96 (i.e., the second axis), and coordinate axis 97 in which excitation light travels. FIG. 22B is a plan view including coordinate axis 95 (i.e., the first axis), and coordinate axis 97 in which excitation light travels. FIG. 23 illustrates a configuration of semiconductor light-emitting device 10A in this light source device 4. FIG. 24 illustrates a design example of the light intensity distribution on the light-emitting surface of phosphor element 30 in this light source device 4.

As shown in FIGS. 22A, 22B, and 23, semiconductor light-emitting device 10A used for light source device 4 according to this embodiment includes semiconductor light-emitting element 11A with two waveguides (ridges) of; first optical waveguide 11a1 with stripe width Wa; and second optical waveguide 11a2 with stripe width Wb. First optical waveguide 11a1 and second optical waveguide 11a2 are formed so that the respective centers are spaced at distance P.

Stripe widths Wa and Wb of semiconductor light-emitting element 11A may fall within, for example, from 0.001 mm to 0.1 mm, and particularly from 0.01 mm to 0.06 mm. Distance P between the centers of first optical waveguide 11a1 and second optical waveguide 11a2 may satisfy P=(Wa+Wb)/2+S, where S falls within a range from 5 μm to 300 μm, particularly from 10 μm to 50 μm.

FIGS. 22A and 22B merely show light 51a emitted from first optical waveguide 11a1 and light 51b emitted from second optical waveguide 11a2, which are incident on lens region 21a of the plurality of lens regions 21.

Phosphor element 30 used for light source device 4 in FIGS. 22A and 22B is the same as phosphor element 30 used in Embodiment 1.

Optical element 20 used for light source device 4 has the same configuration as optical element 20 used in Embodiment 2. The plurality of lens regions 21 focus converted excitation light 54 in different positions in front of phosphor element 30.

In addition, the plurality of lens regions 21 are astigmatic.

Out of the light incident on lens region 21a, light 51a emitted from first optical waveguide 11a1 is converted by optical element 20 into excitation beam 54aa, which forms a circle of least confusion (not shown) and focal lines. The circle of least confusion is formed in front of the light-emitting surface of phosphor element 30. First focal line 57aa is formed farther from the light-emitting surface of phosphor element 30, whereas second focal line 58aa is formed closer to the light-emitting surface of phosphor element 30.

Out of the light incident on lens region 21a, light 51b emitted from second optical waveguide 11a2 is converted by optical element 20 into excitation beam 54ab, which forms a circle of least confusion (not shown) and focal lines. The circle of least confusion is formed in front of phosphor element 30. First focal line 57ab is formed farther from the light-emitting surface of phosphor element 30, whereas second focal line 58ab is formed closer to the light-emitting surface of phosphor element 30.

Out of the light incident on the lens regions of optical element 20 other than lens region 21a, light 51a emitted from first optical waveguide 11a1 is converted into the excitation beams (i.e., excitation light 54). The excitation beams have focal points in different positions in front of the light-emitting surface of phosphor element 30. The excitation beams form first focal lines farther from the light-emitting surface of phosphor element 30, and second focal lines closer to the light-emitting surface of phosphor element 30. The excitation beams (excitation light 54) overlap each other, together with excitation beam 54aa converted at lens region 21a, on the light-emitting surface of phosphor element 30.

Out of the light incident on the lens region of optical element 20 other than lens region 21a, light 51b emitted from second optical waveguide 11a2 is also converted into the excitation beams (i.e., excitation light 54). The excitation beams have focal points in different positions in front of the light-emitting surface of phosphor element 30. The excitation beams form first focal lines farther from the light-emitting surface of phosphor element 30, and second focal lines closer to the light-emitting surface of phosphor element 30. The excitation beams (excitation light 54) overlap each other, together with excitation beam 54ab converted at lens region 21a, on the light-emitting surface of phosphor element 30.

The excitation beams converted from light 51a, which has been emitted from first optical waveguide 11a1 and incident on optical element 20, overlap the excitation beams converted from light 51b, which has been emitted from second optical waveguide 11a2 and incident on optical element 20, at least partially on the light-emitting surface of phosphor element 30.

Width D1 of the excitation beams on the light-emitting surface of phosphor element 30 is greater than width W1, which is the divisional width of each of lens region 21 of optical element 20 in the first direction. Similarly, width D2 of the excitation beams on the light-emitting surface of phosphor element 30 is greater than width W2, which is the divisional width of each of lens region 21 of optical element 20 in the second direction.

With respect to light source device 4 designed in this manner, a design example of the light intensity distribution on the light-emitting surface of phosphor element 30 will be described with reference to FIG. 24. Sections (a) to (c) of FIG. 24 are views from the light radiation side. Upper and lower figures illustrate planer and three-dimensional light intensity distributions, respectively, on the light-emitting surface of phosphor element 30.

Section (a) of FIG. 24 illustrates the intensity distribution of the excitation light, which has been converted by optical element 20 from light 51a emitted from first optical waveguide 11a1, on the light-emitting surface of phosphor element 30. Section (b) of FIG. 24 illustrates the intensity distribution of the excitation light, which has been converted by optical element 20 from light 51b emitted from second optical waveguide 11a2, on the light-emitting surface of phosphor element 30. Section (c) of FIG. 24 illustrates the intensity distribution of the excitation light, which has been converted by optical element 20 from both of light 51a emitted from first optical waveguide 11a1 and light 51b emitted from second optical waveguide 11a2, on the light-emitting surface of phosphor element 30.

As shown in (a) of FIG. 24, the intensity distribution of the excitation light, which has been emitted from first optical waveguide 11a1 and converted at optical element 20, on the light-emitting surface of phosphor element 30 has beam width D1a (along coordinate axis 95) and beam width D2a (along coordinate axis 96), which are uniformized.

Similarly, as shown in (b) of FIG. 24, the intensity distribution of the excitation light, which has been emitted from second optical waveguide 11a2 and converted at optical element 20, on the light-emitting surface of phosphor element 30 has beam width D1b (along coordinate axis 95) and beam width D2b (along coordinate axis 96), which are uniformized.

As shown in (c) of FIG. 24, the intensity distributions of the excitation light, which has been emitted from first optical waveguide 11a1 and second optical waveguide 11a2 and converted at optical element 20, on the light-emitting surface of phosphor element 30, are designed overlap partially. The distributions are integrated into a single uniformized intensity distribution, which has, as a whole, width D1 (along coordinate axis 95) and width D2 (along coordinate axis 96). Here, beam width D1 is almost equal to beam width D1a and beam width D1b, whereas beam width D2 is slightly smaller than or almost equal to the sum of beam width D2a and beam width D2b. The single intensity distribution of excitation light is designed, which is uniformized as a whole and has beam width D1 and beam width D2, which are almost equal to each other.

As described above, even using semiconductor light-emitting element 11A including a plurality of emitters, light source device 4 according to this embodiment allows for efficient conversion of the light emitted from semiconductor light-emitting element 11A into excitation light 54 with a single uniformized intensity distribution. Accordingly, a small-size light source device is achieved.

In the design example according to this embodiment, the shape (i.e., the divisional shape) of each lens region 21 of optical element 20 is hexagonal. Thus, the intensity distribution of the converted excitation light on the light-emitting surface of phosphor element 30 also has a hexagonal shape. With the use of quadrangular lens regions 21, the intensity distribution also has a quadrangular shape.

In light source device 4 according to this embodiment, the focal points of the plurality of lens regions 21 of optical element 20 may be set in front of phosphor element 30. The beam widths are designed larger than the divisional widths of the plurality of lens regions 21. This allows for designing of the intensity distribution of the excitation light in a wider range.

Light source device 4 according to this embodiment uses semiconductor light-emitting element 11A with two optical waveguides. The configuration is not limited thereto. Semiconductor light-emitting element 11 with three optical waveguides may be used. In this case as well, the intensity distributions of the excitation beams, which have been emitted from adjacent ones of the optical waveguides and converted at optical element 20, on the light-emitting surface of phosphor element 30 are designed to overlap partially. This allows for conversion into the excitation light with a single uniformized intensity distribution. A small-size light source device is achieved.

In this embodiment, phosphor element 30 is arranged like in Embodiment 1. Instead, if phosphor element 30 is arranged like in Embodiments 2 and 3, a light source device with the same or similar or advantages is achieved. In this case, excitation light is incident on phosphor element 30 obliquely, and thus the beam widths may different from incident position to incident position. In semiconductor light-emitting element 11A, stripe width Wa of first optical waveguide 11a1 may be different from stripe width Wb of second optical waveguide 11a2.

In this embodiment, optical element 20 may be replaced with optical element 20B or 20C of Variation 1 or 2 of Embodiment 3.

In light source device 4 according to this embodiment, the light emitting positions in phosphor element 30 may be variable by controlling the on and off states of the two optical waveguides of semiconductor light-emitting element 11A individually. A light source device with a variable light distribution is then achieved in a projector combined with a reflector or a projection lens. For example, if light source device 4 is used as a lighting tool for automotive headlight, the two optical waveguides may be turned on to provide a high beam and one of the optical waveguides may be turned on to provide a low beam.

Embodiment 5

Figure 25:
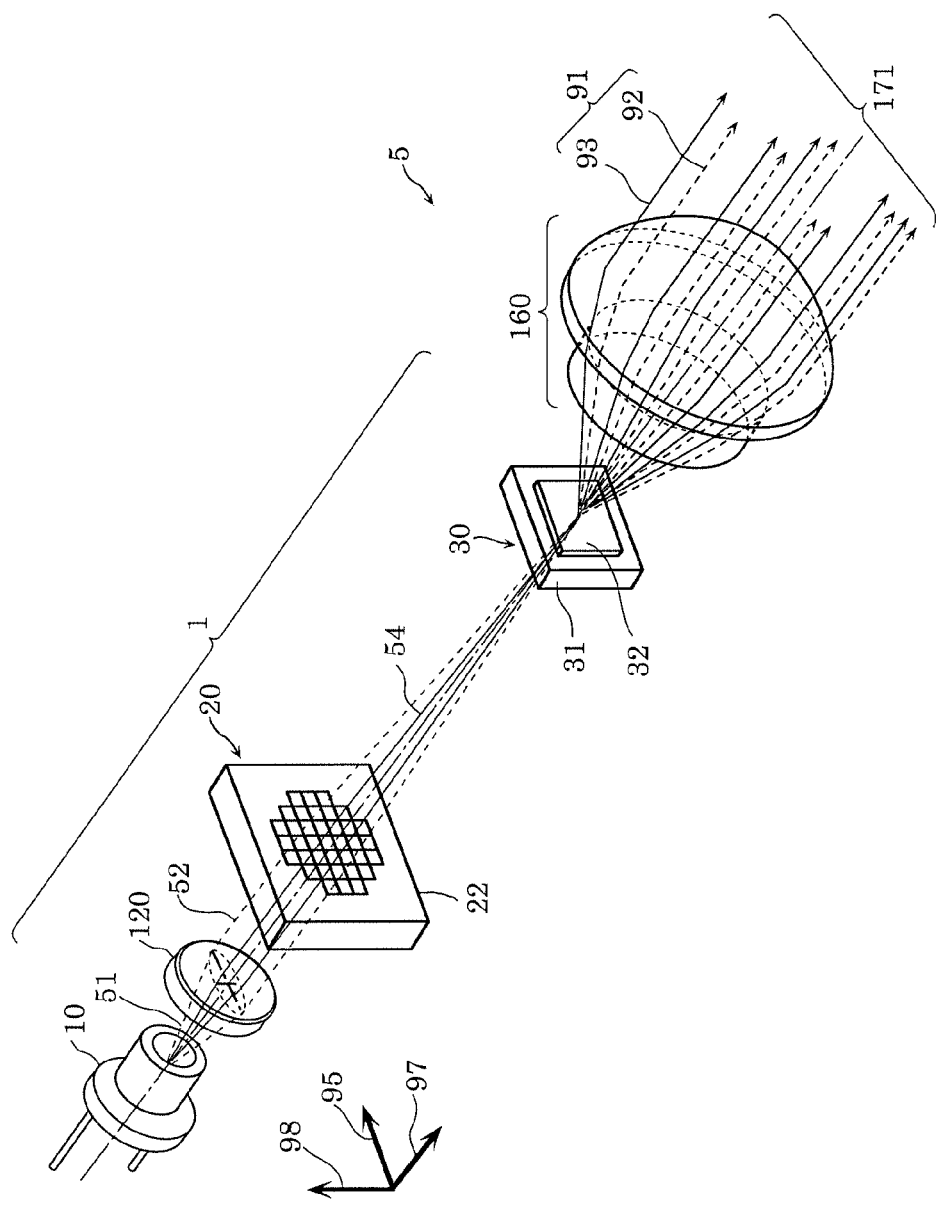
FIG. 25 illustrates a configuration of a projector according to Embodiment 5 of the present disclosure.

Next, projector 5 according to Embodiment 5 of the present disclosure will be described with reference to FIG. 25. FIG. 25 illustrates a configuration of projector 5 according to Embodiment 5 of the present disclosure.

As shown in FIG. 25, projector 5 is, for example, a lighting tool for automotive headlight, which includes light source device 1 according to Embodiment 1 and projection lens 160. Projection lens 160 is a lens for changing the angle of light 91 radiated from light source device 1 and projecting the light forward. In this embodiment, projection lens 160 is a combination lens of two lenses, but not limited thereto. Projection lens 160 may be configured as a single lens or consisting of a plurality of lens. For example, projection lens 160 may be a compound lens consisting of four lenses.

Since projector 5 according to this embodiment uses light source device 1 according to Embodiment 1, a small-size projector is achieved.

While projector 5 according to this embodiment uses light source device 1 according to Embodiment 1, the configuration is not limited thereto. For example, any one of the light source devices according to Embodiments 2 to 4 may be used as a light source device for the projector according to this embodiment.

Embodiment 6

Figure 26:
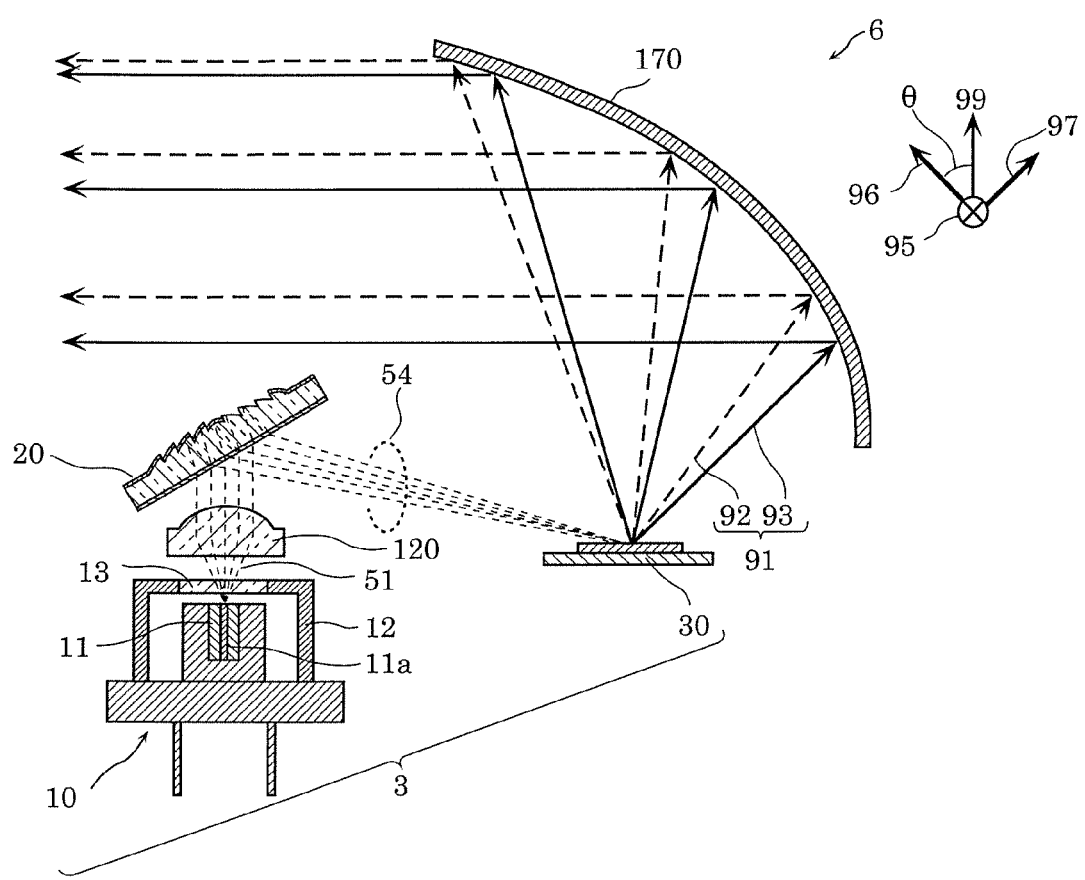
FIG. 26 illustrates a configuration of a projector according to Embodiment 6 of the present disclosure.
Figure 27:
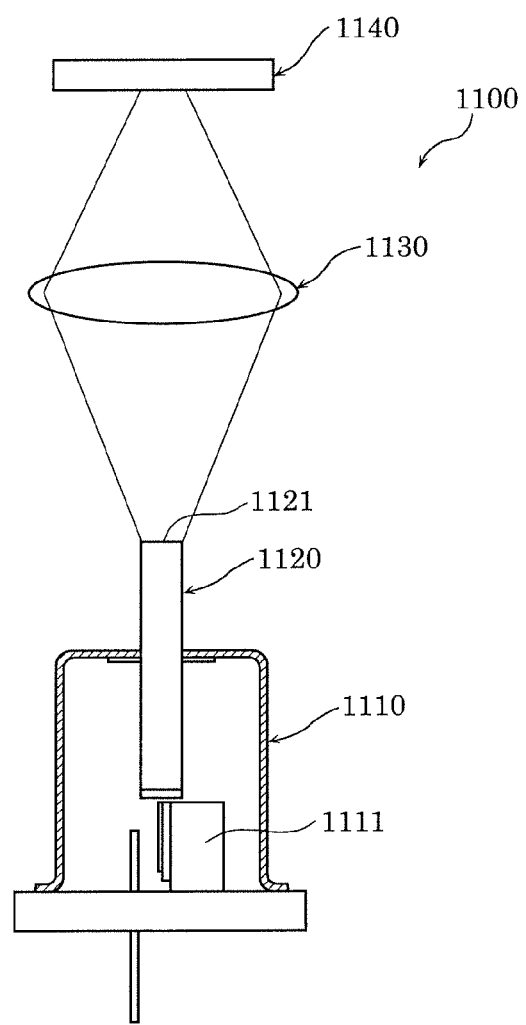
FIG. 27 illustrates a configuration of a light source device according to background art.
Figure 28:
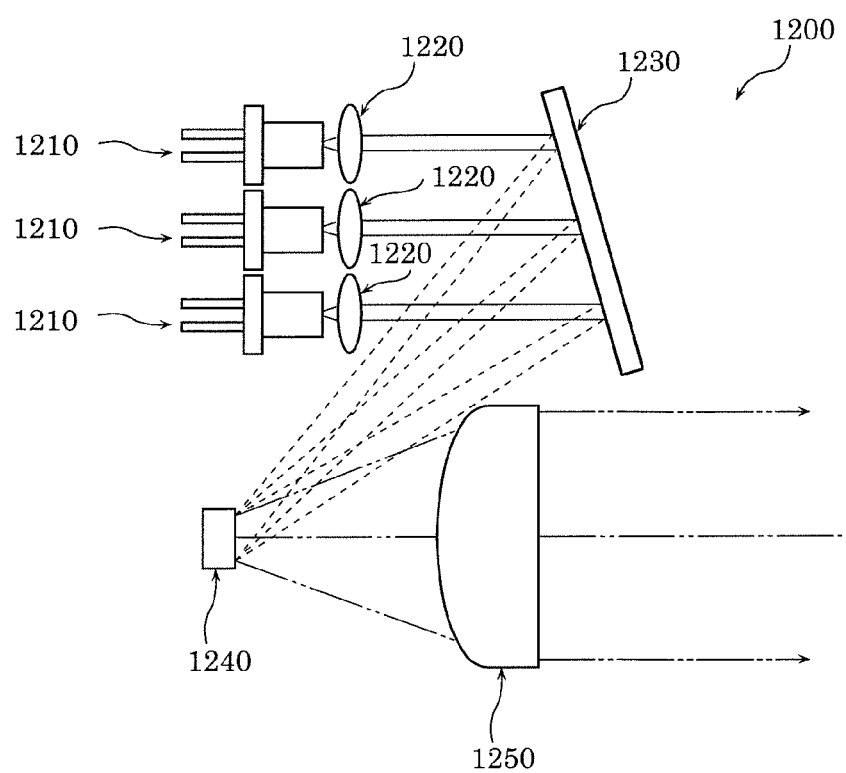
FIG. 28 illustrates a configuration of another light source device according to background art.

Next, projector 6 according to Embodiment 6 of the present disclosure will be described with reference to FIG. 26. FIG. 26 illustrates a configuration of projector 6 according to Embodiment 6 of the present disclosure.

As shown in FIG. 26, projector 6 includes light source device 3 according to Embodiment 3 and reflector 170. Reflector 170 is a reflection member for changing the angle of light 91 radiated from light source device 3 and to project the light forward.

Since projector 6 according to this embodiment uses light source device 3 according to Embodiment 3, a small-size projector is achieved.

While projector 6 according to this embodiment uses light source device 3 according to Embodiment 3, the configuration is not limited thereto. For example, any one of the light source devices according to Embodiments 1, 2, 4, and 5 may be used as the light source device for the projector according to this embodiment.

OTHER VARIATIONS

The light source device and the projector according to the present disclosure have been described above based on the embodiments and variations. However, the present disclosure is not limited to the embodiments and variations described above.

For example, the light source device according to the present disclosure may be utilized as a light source for processing such as soldering, annealing, or welding by irradiating the surface of a target to be processed, instead of the phosphor element. In this case, no visible light laser element but an infrared laser element may be used as the semiconductor light-emitting element.

Although only some exemplary embodiments of the present disclosure have been described in detail above, those skilled in the art will readily appreciate that many modifications and free combination of constituent elements and functions are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to various types of optical devices such as a light source device including a semiconductor light-emitting element and a phosphor element, and a projector using the light source device. The light source device according to the present disclosure is applicable not only to a lighting light source but also to a light source for other purposes such as processing.

What is claimed is:
1. A light source device, comprising:
a laser element;
an optical element including a plurality of lens regions that are divisional regions and change an intensity distribution of light emitted from the laser element; and
a phosphor element that emits, as excitation light, the light with the intensity distribution changed by the optical element, wherein
focal points of the plurality of lens regions are present in front of or behind a light-emitting surface of the phosphor element in different positions, at least one of the plurality of lens regions is astigmatic,
an excitation beam from the at least one of the plurality of lens regions that is astigmatic forms a circle of least confusion near an associated one of the focal points, and a first focal line and a second focal line sandwiching the circle of least confusion behind and in front of the circle of least confusion, and
beams from the plurality of lens regions overlap each other on the light-emitting surface of the phosphor element.

2. The light source device according to claim 1, wherein
the plurality of lens regions are divided into regions along a first axis and regions along a second axis orthogonal to the first axis,
the light emitted from the laser element is incident on the plurality of lens regions at a smaller angle of radiation along the second axis than along the first axis, and
light along the first axis is most focused in a position corresponding to the first focal line, and light along the second axis is most focused in a position corresponding to the second focal line.

3. The light source device according to claim 2, wherein
the plurality of lens regions are astigmatic, and
in an intensity distribution of the excitation light from the plurality of lens regions on the light-emitting surface of the phosphor element, $D1 \leq D2$ is satisfied, where D1 denotes a beam width along the first axis and D2 denotes a beam width along the second axis.

4. The light source device according to claim 2, wherein
a divisional width along the first axis is greater than a divisional width along the second axis.

5. The light source device according to claim 1, wherein
the phosphor element is inclined about the first axis,
each of the plurality of lens regions is astigmatic, and
second focal lines of the plurality of lens regions are present near the light-emitting surface of the phosphor element.

6. The light source device according to claim 1, wherein
the optical element is rectangular in a plan view.

7. The light source device according to claim 1, wherein
the plurality of lens regions form a Fresnel lens, and
a step is located around and in contact with the plurality of lens regions.

8. The light source device according to claim 1, wherein
the optical element includes a glass substrate, and a dielectric film on the glass substrate, and
the plurality of lens regions are located in the dielectric film.

9. The light source device according to claim 7, wherein
an absorption film that absorbs peripheral light around the light emitted from the laser element is formed around the plurality of lens regions.

10. The light source device according to claim 1, wherein
the optical element includes a convex lens that changes an angle of divergence of the light emitted from the laser element, and
light transmitted through the convex lens is incident on the plurality of lens regions.

11. The light source device according to claim 10, wherein
the convex lens is a Fresnel lens, and
a step is located around and in contact with the convex lens.

12. The light source device according to claim 10, wherein
an opening film that blocks peripheral light around the light emitted from the laser element is formed around the plurality of lens regions.

13. The light source device according to claim 1, wherein
some or all of the plurality of lens regions are in quadrangular or hexagonal shapes.

14. The light source device according to claim 5, wherein
in an intensity distribution of the excitation light on the light-emitting surface of the phosphor element, D that denotes a beam width as a design value, D1 that denotes a beam width along the first axis, and D2 that denotes a beam width along the second axis satisfy relational expressions $D=W \times (F2/F1)/\cos(\theta)$, $D<D1<W1$, and $D<D2<W1$, where
W1 denotes a divisional width of each of the plurality of lens regions along the first axis,
W denotes a stripe width of the laser element in a direction with a smaller angle of radiation,
F1 denotes a focal length on a side that receives radiation light from the laser element,
F2 denotes a distance from the plurality of lens regions formed in the optical element to the light-emitting surface of the phosphor element along an optical axis of the excitation light, and
$\theta$ is an incident angle of the excitation light incident on the light-emitting surface of the phosphor element.

15. The light source device according to claim 14, wherein
the intensity distribution on the light-emitting surface of the phosphor element is in a shape of a truncated quadrangular pyramid with two base sides at least partially parallel to the first axis, and two base sides at least partially parallel to the second axis.

16. A light source device, comprising:
a laser element including a plurality of emitters;
an optical element including a plurality of lens regions that change an intensity distribution of light emitted from the laser element; and
a phosphor element that emits, as excitation light, the light with the intensity distribution changed by the optical element, wherein
respective focal points of the plurality of lens regions are present in front of or behind a light-emitting surface of the phosphor element in different positions,
each of the plurality of lens regions is astigmatic,
each of excitation beams forms a circle of least confusion near an associated one of the focal points, and a first focal line and a second focal line sandwiching the circle of least confusion, with the second focal line located at one side of the circle of least confusion, which is closer to the phosphor element, and the first focal line located at an other side, and
beams from the plurality of lens regions associated with the plurality of emitters overlap each other on the light-emitting surface of the phosphor element, and
beams from adjacent ones of the plurality of emitters partially overlap each other at least on the light-emitting surface of the phosphor element.

17. The light source device according to claim 16, wherein
the plurality of lens regions are divided into those along a first axis and those along a second axis orthogonal to the first axis,
the light emitted from the laser element is incident on the plurality of lens regions at a smaller angle of radiation along the second axis than along the first axis, and
light along the first axis is most focused in a position corresponding to the first focal line, and light along the second axis is most focused in a position corresponding to the second focal line.

18. The light source device according to claim 17, wherein
the phosphor element is inclined about the first axis, and
the second focal line of each of the plurality of lens regions is present near the light-emitting surface of the phosphor element.

19. A projector, comprising:
the light source device according to claim 1.

20. A light source device that irradiates, with a laser beam, a surface of a target to be processed, the light source device comprising:
a laser element; and
an optical element including a plurality of lens regions that are divisional regions and change an intensity distribution of light emitted from the laser element, wherein
respective focal points of the plurality of lens regions are present in front of or behind a surface of the target to be processed in different positions,
at least one of the plurality of lens regions is astigmatic,
an excitation beam from the at least one of the plurality of lens regions that is astigmatic forms a circle of least confusion near an associated one of the focal points, and a first focal line and a second focal line sandwiching the circle of least confusion behind and in front of the circle of least confusion, respectively, and
beams from the plurality of lens regions overlap each other on the surface of the target to be processed.

21. A light source device that irradiates, with a laser beam, a surface of a target to be processed, the light source device comprising:
a laser element including a plurality of emitters; and
an optical element including a plurality of lens regions that change an intensity distribution of light emitted from the laser element, wherein
respective focal points of the plurality of lens regions are present in front of or behind a surface of the target to be processed in different positions,
at least one of the plurality of lens regions is astigmatic,
each of excitation beams forms a circle of least confusion near an associated one of the focal points, and a first focal line and a second focal line sandwiching the circle of least confusion, with the second focal line located at one side of the circle of least confusion, which is closer to a phosphor element, and the first focal line located at an other side, and
beams from the plurality of lens regions associated with the plurality of emitters overlap each other on the surface of the target to be processed, and beams from adjacent ones of the plurality of emitters partially overlap each other at least on the surface of the target to be processed.

* * * * *